(12) United States Patent
Coombs

(10) Patent No.: US 12,267,378 B2
(45) Date of Patent: *Apr. 1, 2025

(54) DATA STREAM PROCESSING SYSTEM AND METHODS FOR USE THEREWITH

(71) Applicant: Ocient Holdings LLC, Chicago, IL (US)

(72) Inventor: Daniel Coombs, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,776

(22) Filed: Feb. 12, 2024

(65) Prior Publication Data

US 2024/0214442 A1 Jun. 27, 2024

Related U.S. Application Data

(63) Continuation of application No. 18/336,348, filed on Jun. 16, 2023, now Pat. No. 11,936,709, which is a continuation of application No. 18/052,985, filed on Nov. 7, 2022, now Pat. No. 11,743,316, which is a continuation of application No. 17/678,570, filed on Feb. 23, 2022, now Pat. No. 11,533,353, which is a continuation of application No. 17/119,311, filed on Dec. 11, 2020, now Pat. No. 11,297,123.

(51) Int. Cl.
*G06F 15/16* (2006.01)
*G06F 16/903* (2019.01)
*H04L 65/75* (2022.01)

(52) U.S. Cl.
CPC ........ *H04L 65/75* (2022.05); *G06F 16/90335* (2019.01)

(58) Field of Classification Search
CPC .................. H04L 65/601; G06F 16/90335
See application file for complete search history.

(56) References Cited

U.S. PATENT DOCUMENTS

| 5,548,770 A | 8/1996 | Bridges |
| 6,230,200 B1 | 5/2001 | Forecast |
| 6,633,772 B2 | 10/2003 | Ford |
| 7,499,907 B2 | 3/2009 | Brown |

(Continued)

OTHER PUBLICATIONS

A new high performance fabric for HPC, Michael Feldman, May 2016, Intersect360 Research.

(Continued)

*Primary Examiner* — Oleg Survillo
(74) *Attorney, Agent, or Firm* — Garlick & Markison; Katherine C. Stuckman; Bruce E. Stuckman

(57) ABSTRACT

A data stream processing system is operable to generate key assignment data indicating assignment of each of a plurality of subsets of a plurality of possible keys to a plurality of feed receiver modules by assigning one owner feed receiver module of the plurality of feed receiver modules to each key of the plurality of possible keys for a plurality of incoming messages, and by further assigning a set of follower feed receiver modules of the plurality of feed receiver modules to the each key of the plurality of possible keys. The plurality of incoming messages are processed via the plurality of feed receiver modules based on the key assignment data.

20 Claims, 31 Drawing Sheets

(56) References Cited

U.S. PATENT DOCUMENTS

| | | | |
|---|---|---|---|
| 7,908,242 | B1 | 3/2011 | Achanta |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2017/0228460 | A1* | 8/2017 | Amel ................ G06F 16/248 |
| 2020/0134081 | A1* | 4/2020 | Ho .................... G06F 16/252 |
| 2020/0296138 | A1* | 9/2020 | Crabtree ............ G06F 16/2477 |
| 2021/0334409 | A1* | 10/2021 | Weintraub .......... G06F 21/64 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

\* cited by examiner database system 10 computing device 18 computing device 18 computing device 18 node 37 node 37 node 37 data set

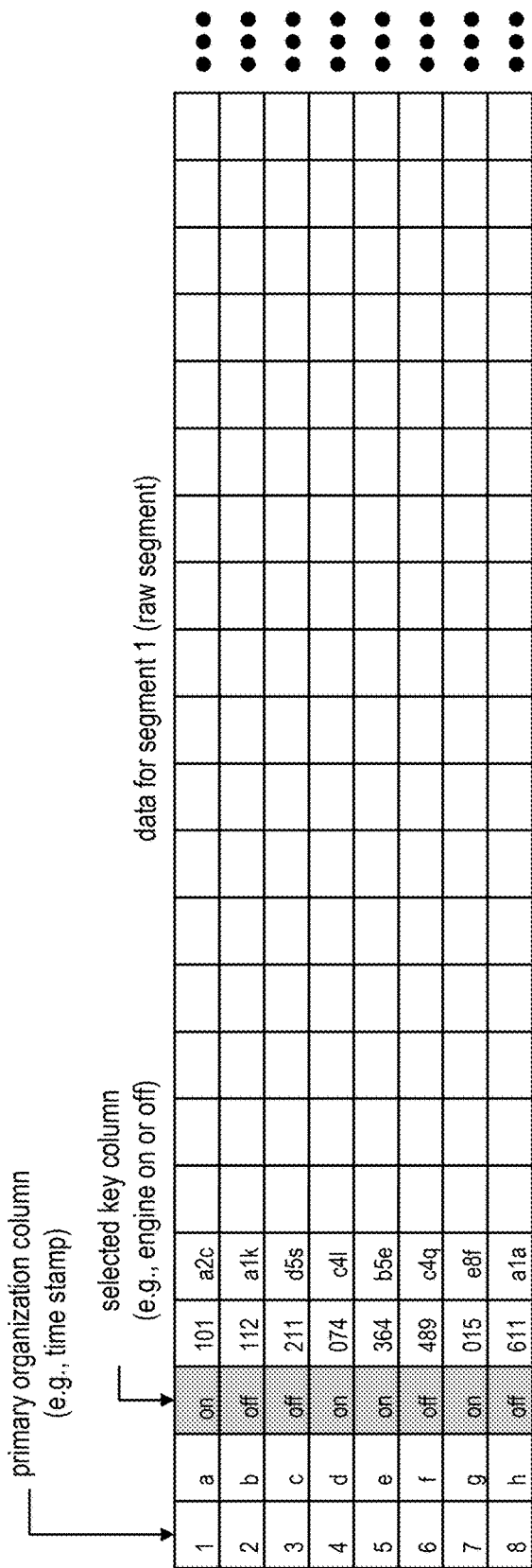

FIG. 21

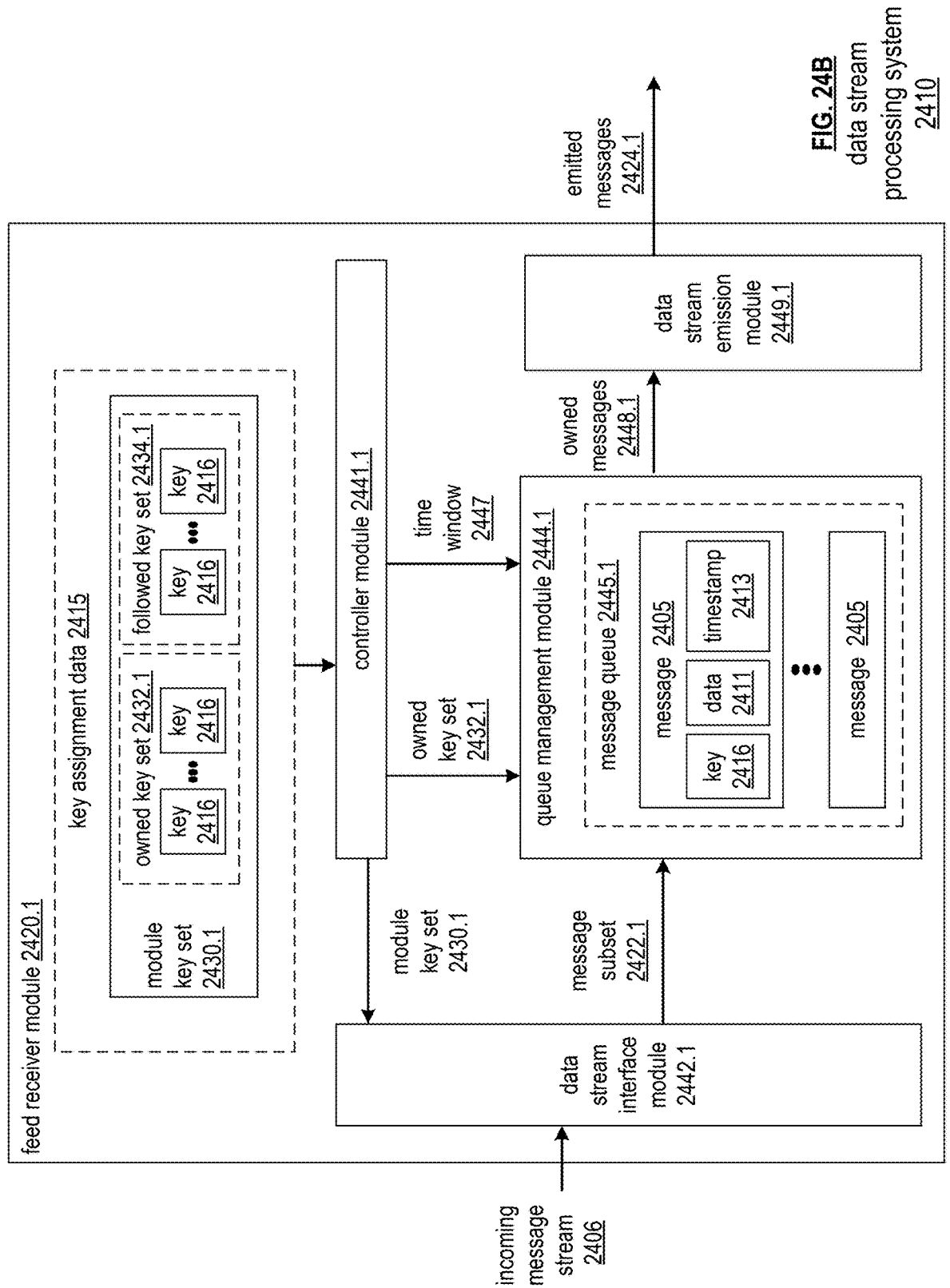

data stream processing system 2410 data stream processing system 2410

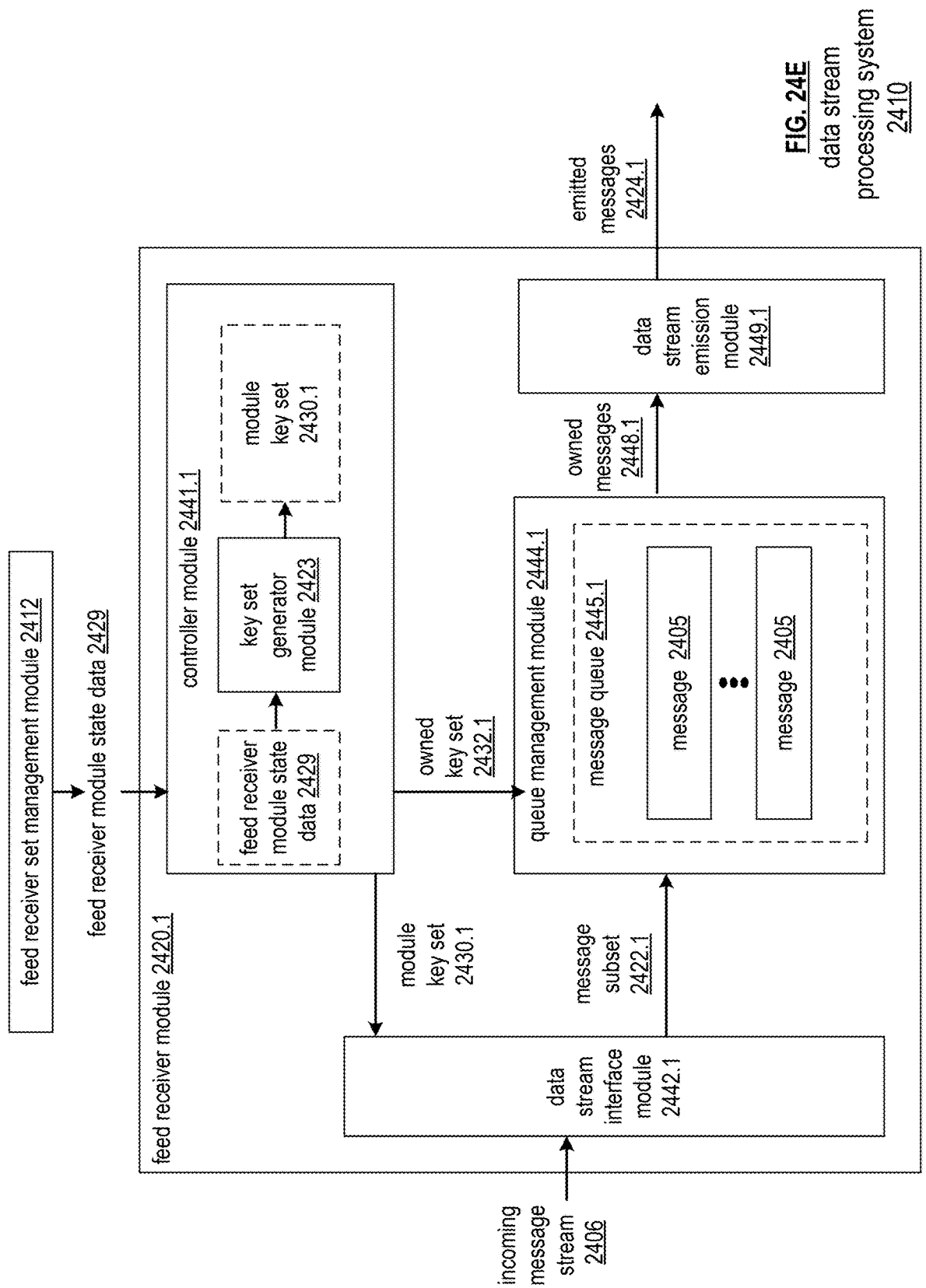

data stream processing system 2410

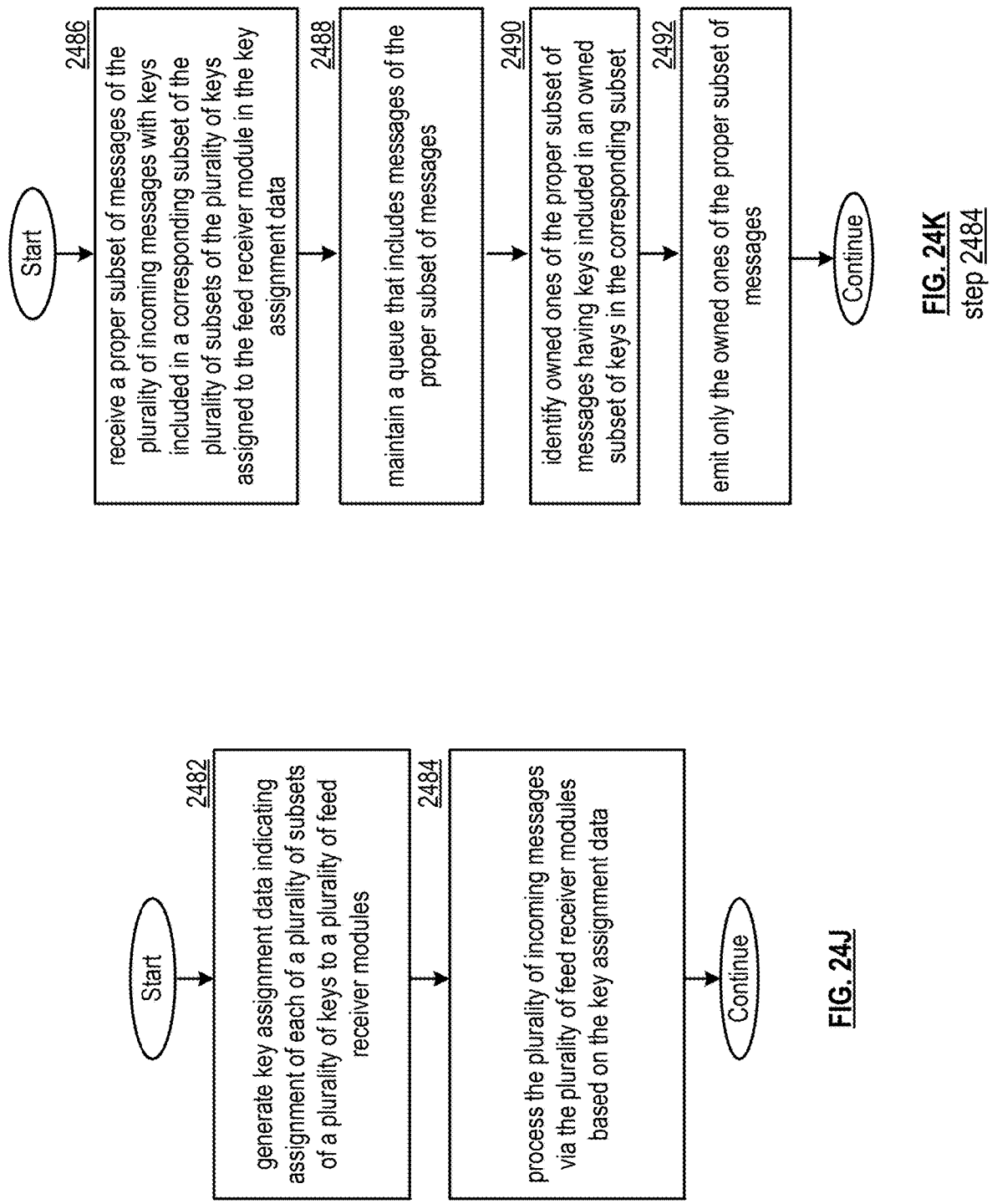

DATA STREAM PROCESSING SYSTEM AND METHODS FOR USE THEREWITH

CROSS-REFERENCE TO RELATED APPLICATIONS

The present U.S. Utility Patent Application claims priority pursuant to 35 U.S.C. § 120 as a continuation of U.S. Utility application Ser. No. 18/336,348, entitled "GENERATING KEY ASSIGNMENT DATA FOR MESSAGE PROCESSING", filed Jun. 16, 2023, which is a continuation of U.S. Utility application Ser. No. 18/052,985, entitled "UTILIZING KEY ASSIGNMENT DATA FOR MESSAGE PROCESSING", filed Nov. 7, 2022, issued as U.S. Pat. No. 11,743,316 on Aug. 29, 2023, which is a continuation of U.S. Utility application Ser. No. 17/678,570, entitled "PROCESSING MESSAGES BASED ON KEY ASSIGNMENT DATA", filed Feb. 23, 2022, issued as U.S. Pat. No. 11,533,353 on Dec. 20, 2022, which is a continuation of U.S. Utility application Ser. No. 17/119,311, entitled "FAULT-TOLERANT DATA STREAM PROCESSING", filed Dec. 11, 2020, issued as U.S. Pat. No. 11,297,123 on Apr. 5, 2022, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

Figure 24A:
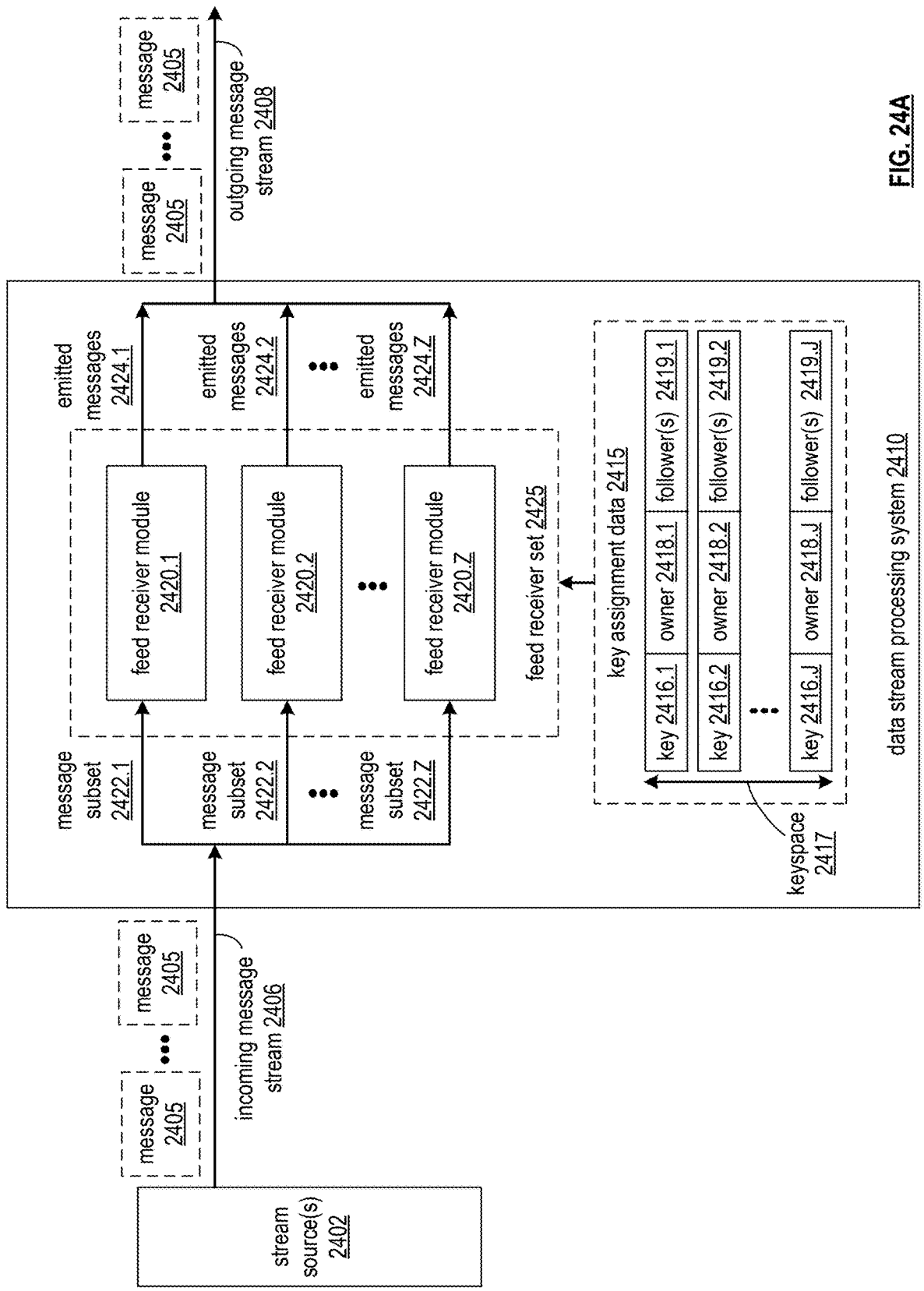
FIG. 24A is a schematic block diagram of a data stream processing system in accordance with various embodiments of the present invention.
Figure 24C:
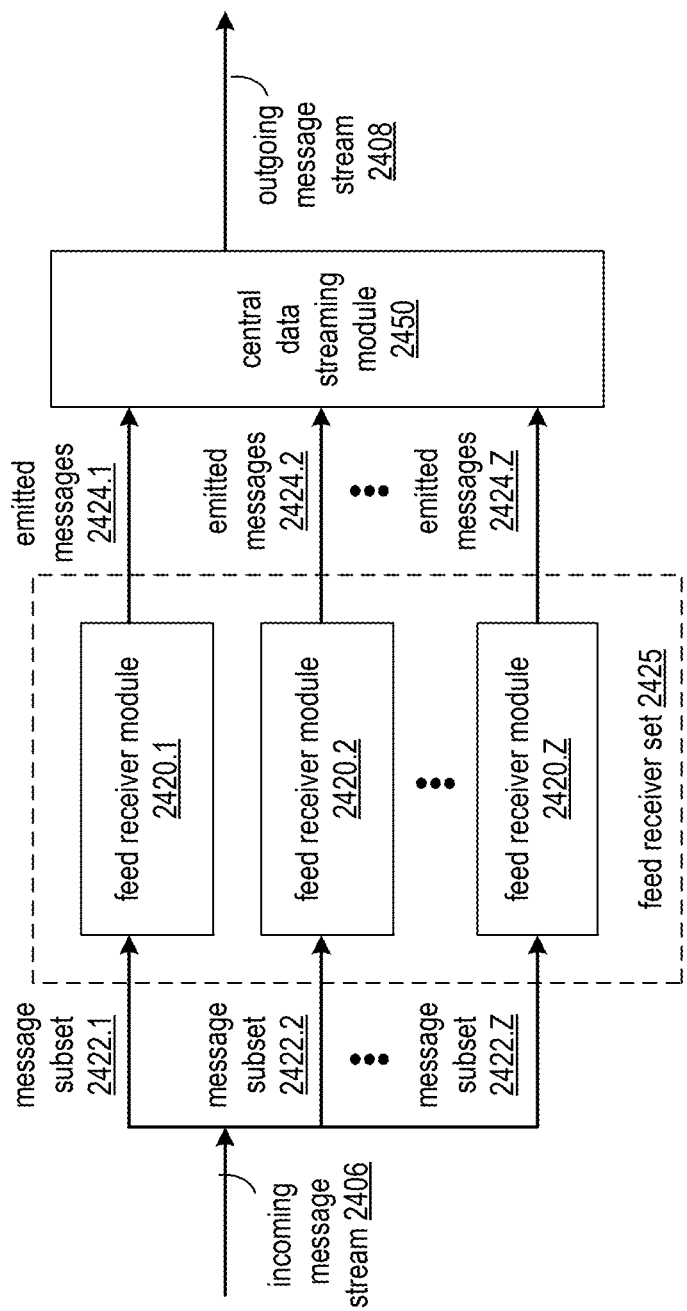
FIG. 24C is a schematic block diagram of a data stream processing system that implements a central data streaming module in accordance with various embodiments of the present invention.
Figure 24D:
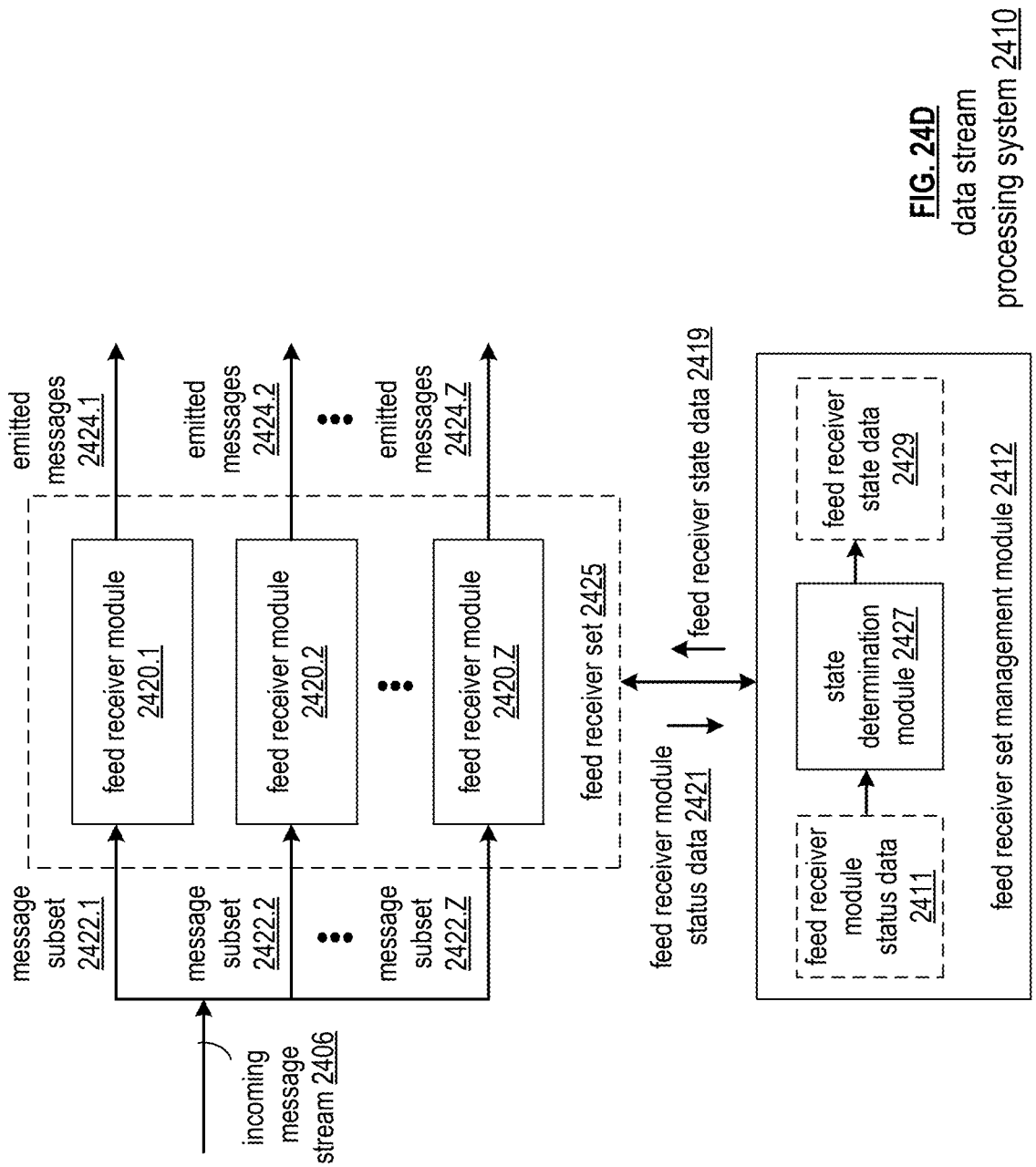
FIG. 24D is a schematic block diagram of a data stream processing system that implements a feed receiver set management module in accordance with various embodiments of the present invention.
Figure 24F:
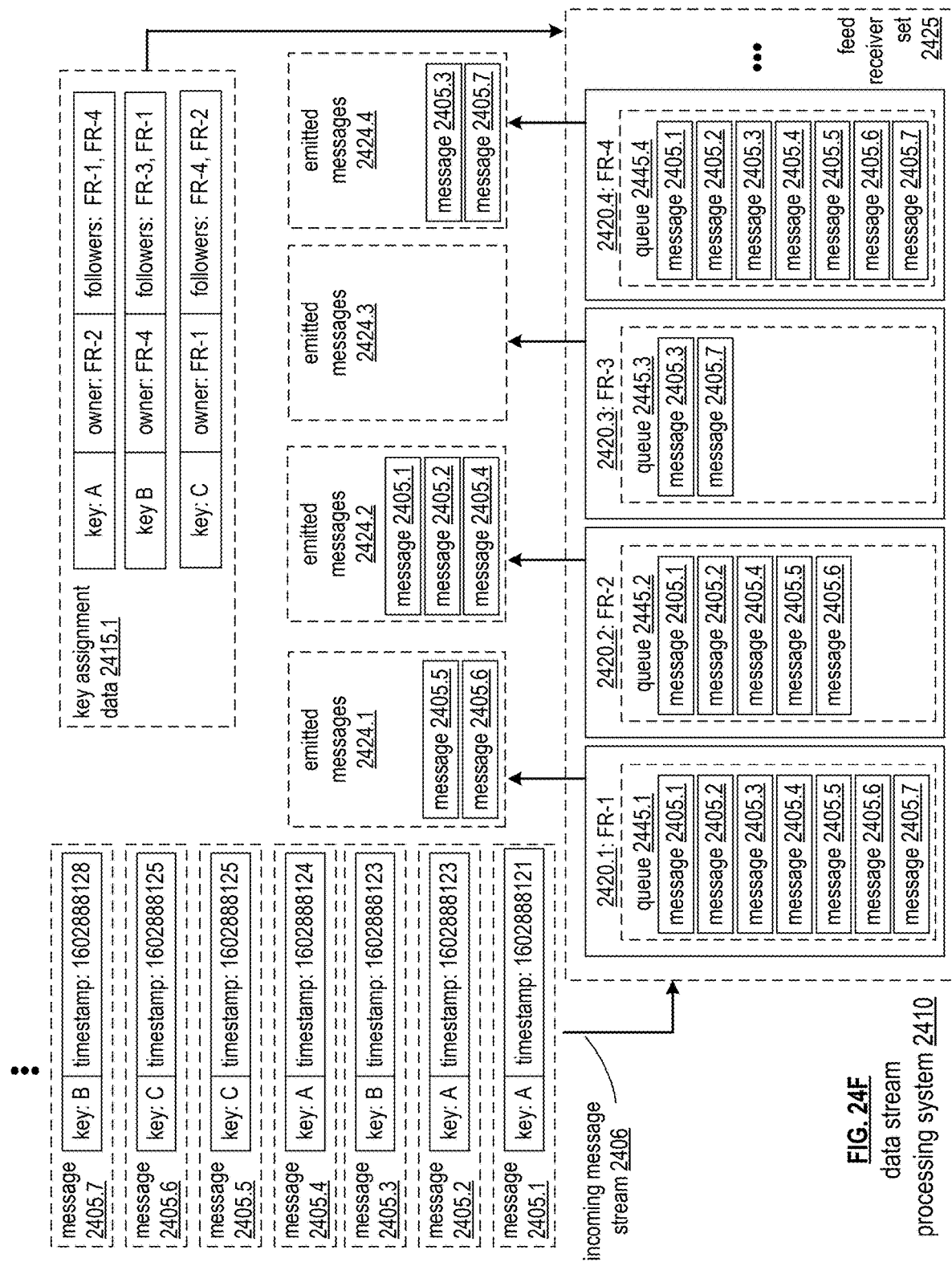
FIGS. 24F-24G illustrate embodiments of a set of feed receiver modules of data stream processing system that emit example sets of emitted messages based on example key assignment data in accordance with various embodiments of the present invention.
Figure 24G:
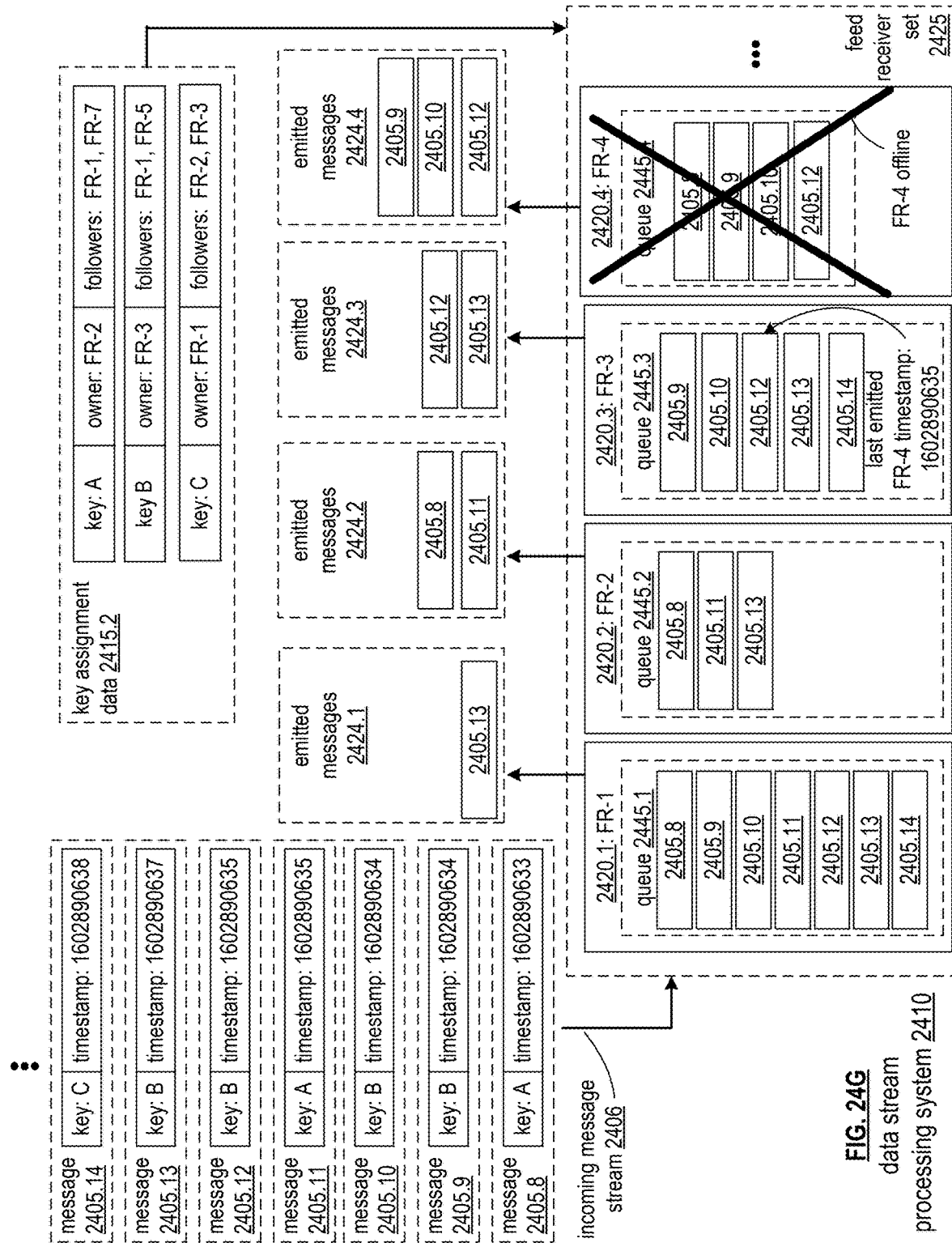
Figure 24H:
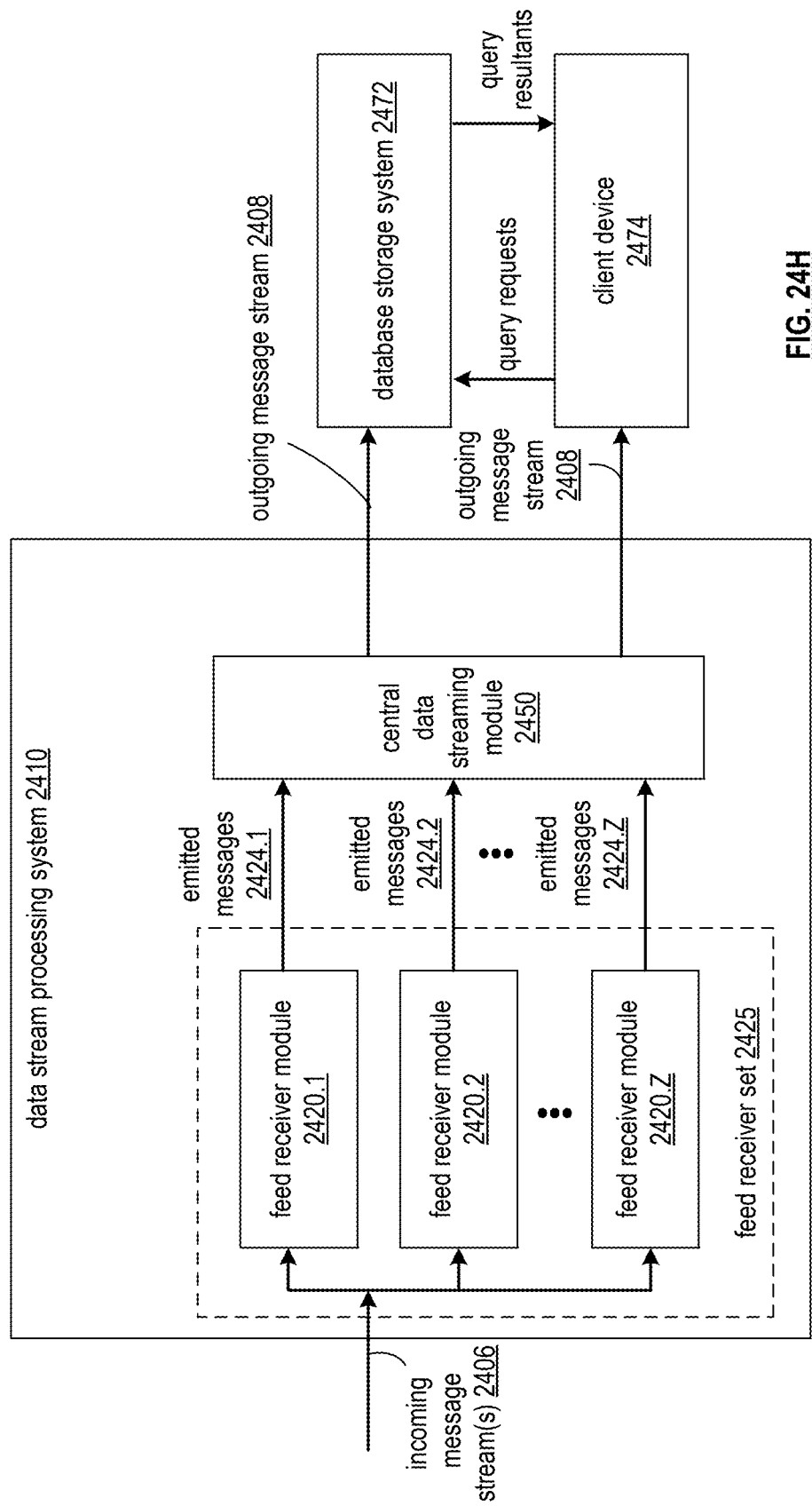
FIG. 24B is a schematic block diagram of a feed receiver module of a data stream processing system in accordance with various embodiments of the present invention.
FIG. 24E is a schematic block diagram of a feed receiver module of a data stream processing system that implements a key assignment module in accordance with various embodiments of the present invention.
Figure 24I:
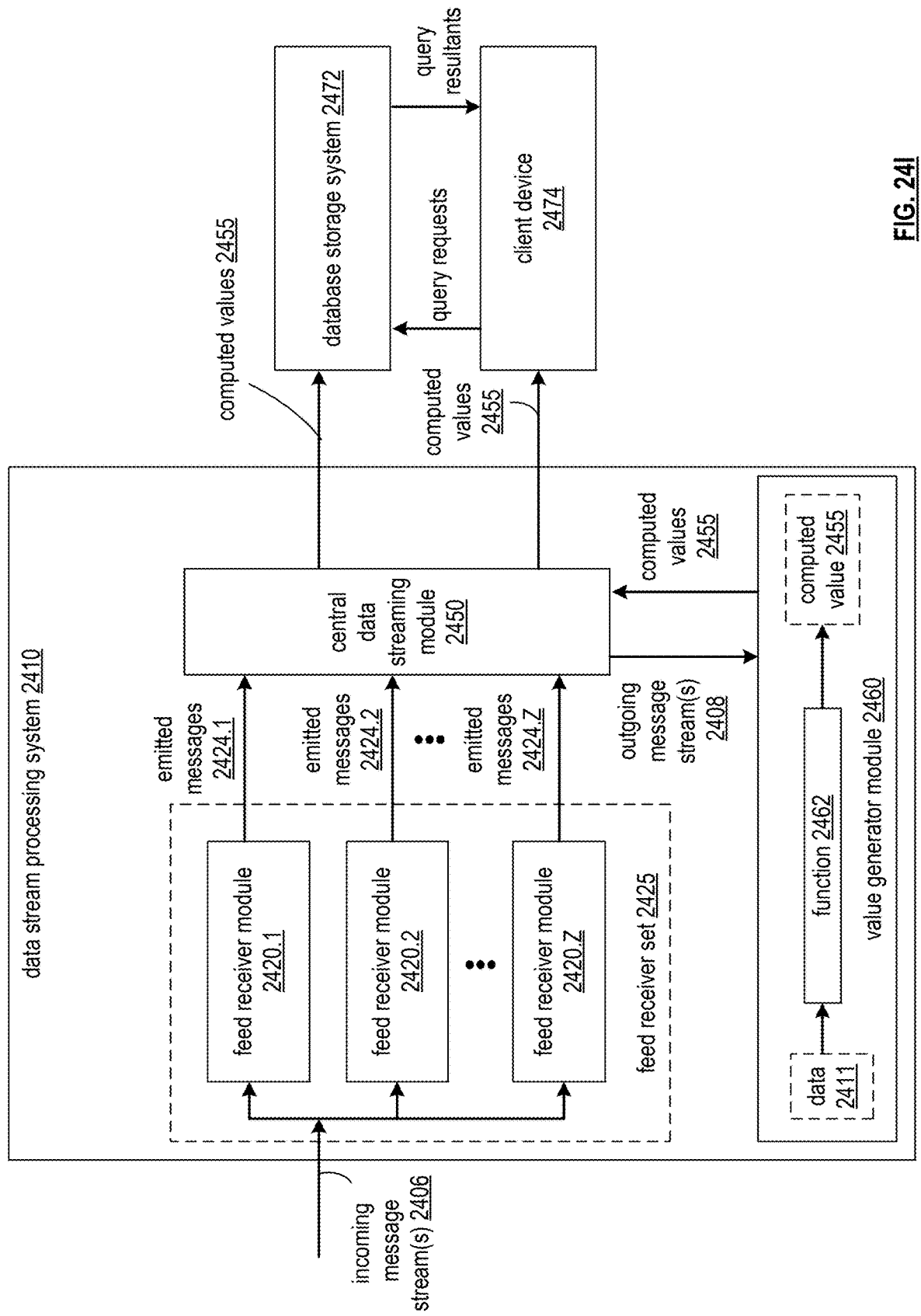

FIG. 24H is a schematic block diagram of a data stream processing system in accordance with various embodiments of the present invention; and FIG. 24I is a schematic block diagram of a data stream processing system that implements a value generator module in accordance with various embodiments of the present invention; and FIGS. 24J-24K are logic diagrams illustrating a method of processing a stream of incoming data in accordance with various embodiments of the present invention.

DETAILED DESCRIPTION OF THE INVENTION

Figure 1:
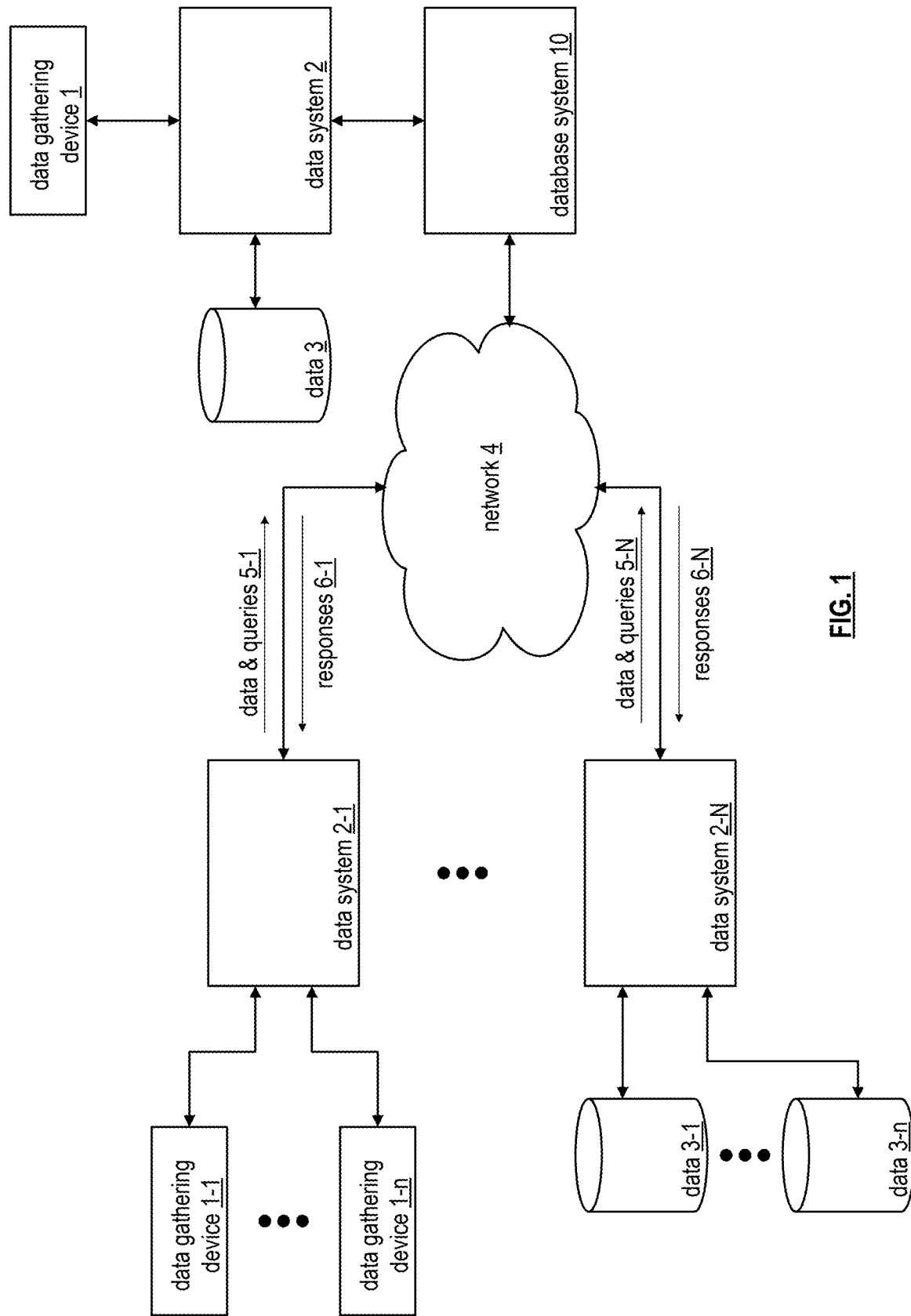
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
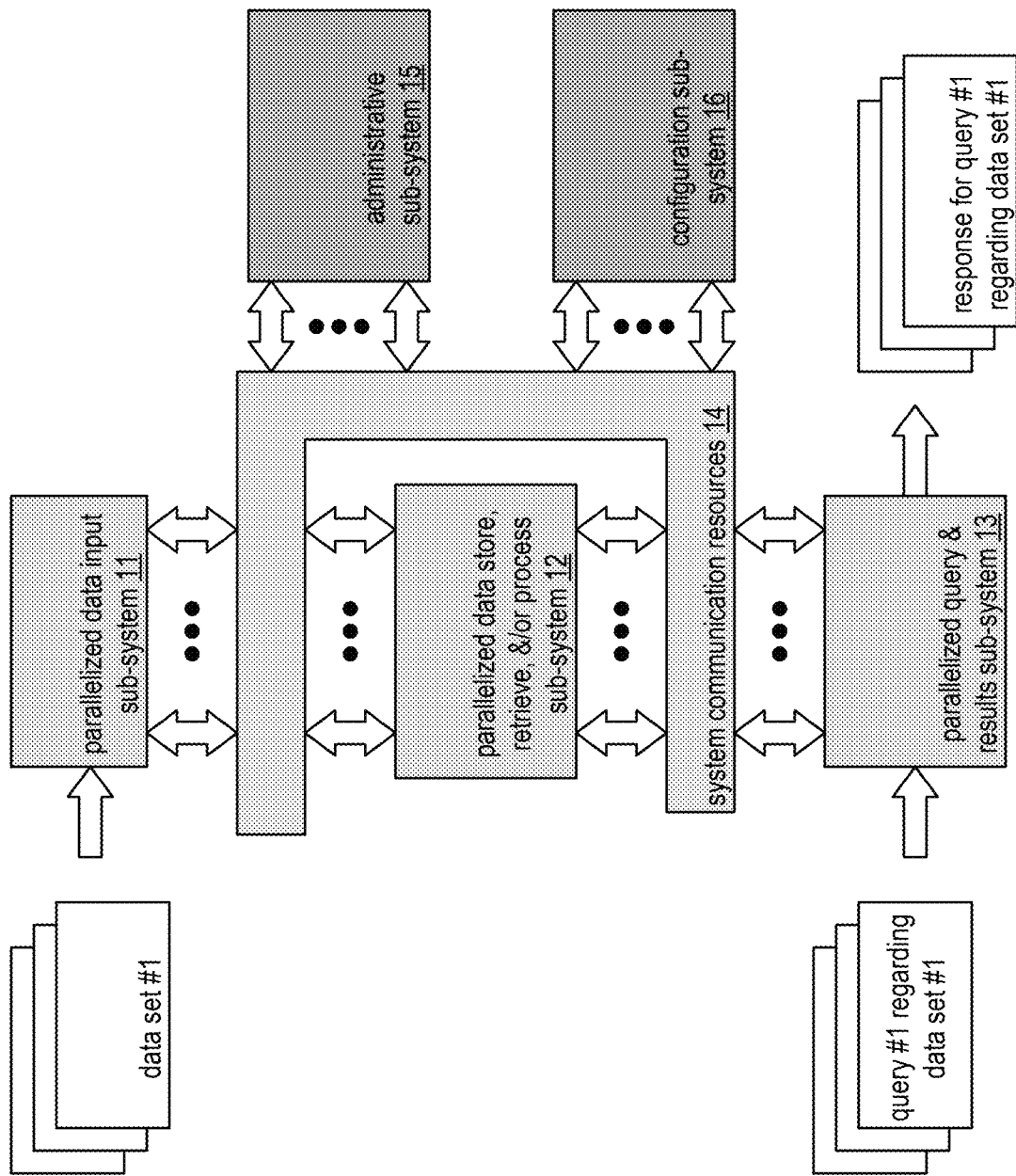
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
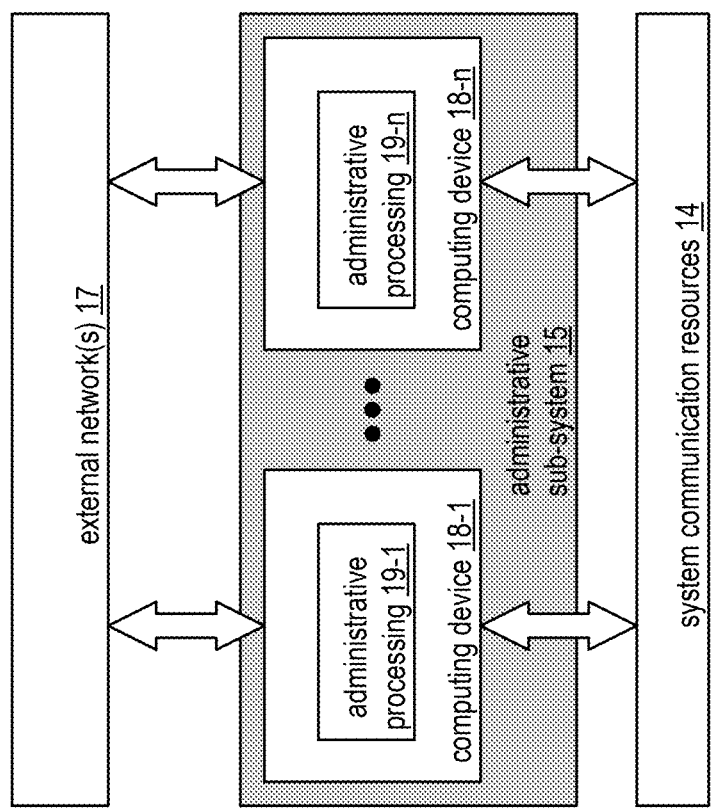
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
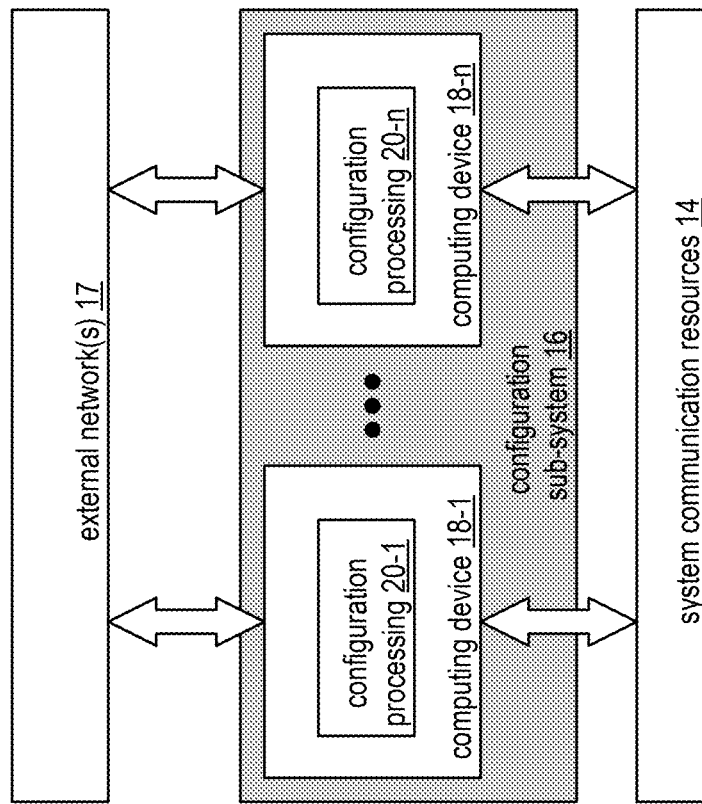
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-$n$. Each of the computing devices executes a configuration processing function 20-1 through 20-$n$ (which includes a plurality of configuration operations) that coordinates system level configurations of the database system. Each computing device is coupled to the external network 17 of FIG. 2, or networks, and to the system communication resources 14 of FIG. 1A.

Figure 4:
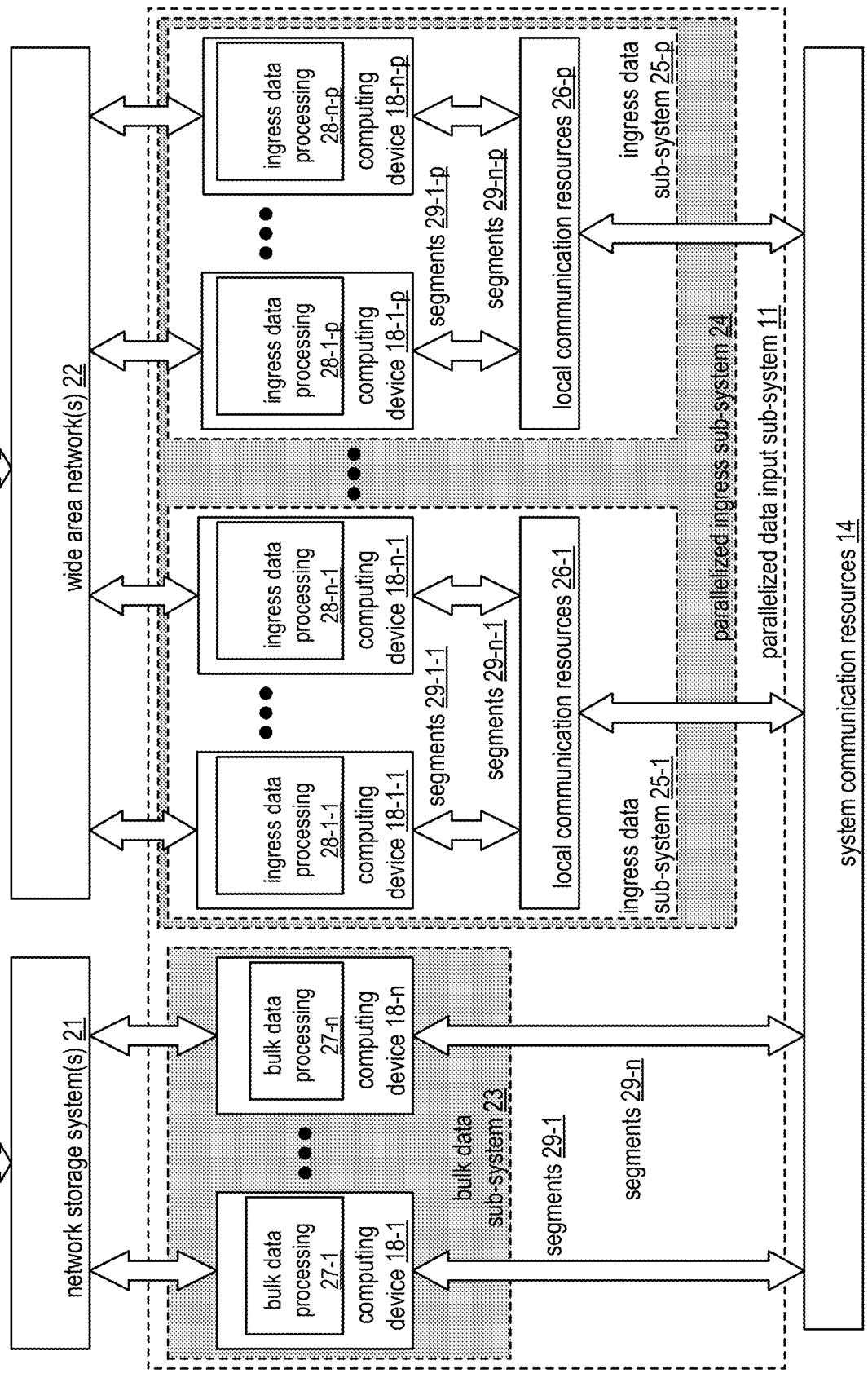
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-$n$. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-$p$ that each include a local communication resource of local communication resources 26-1 through 26-$p$ and a plurality of computing devices 18-1 through 18-$n$. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-$p$, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
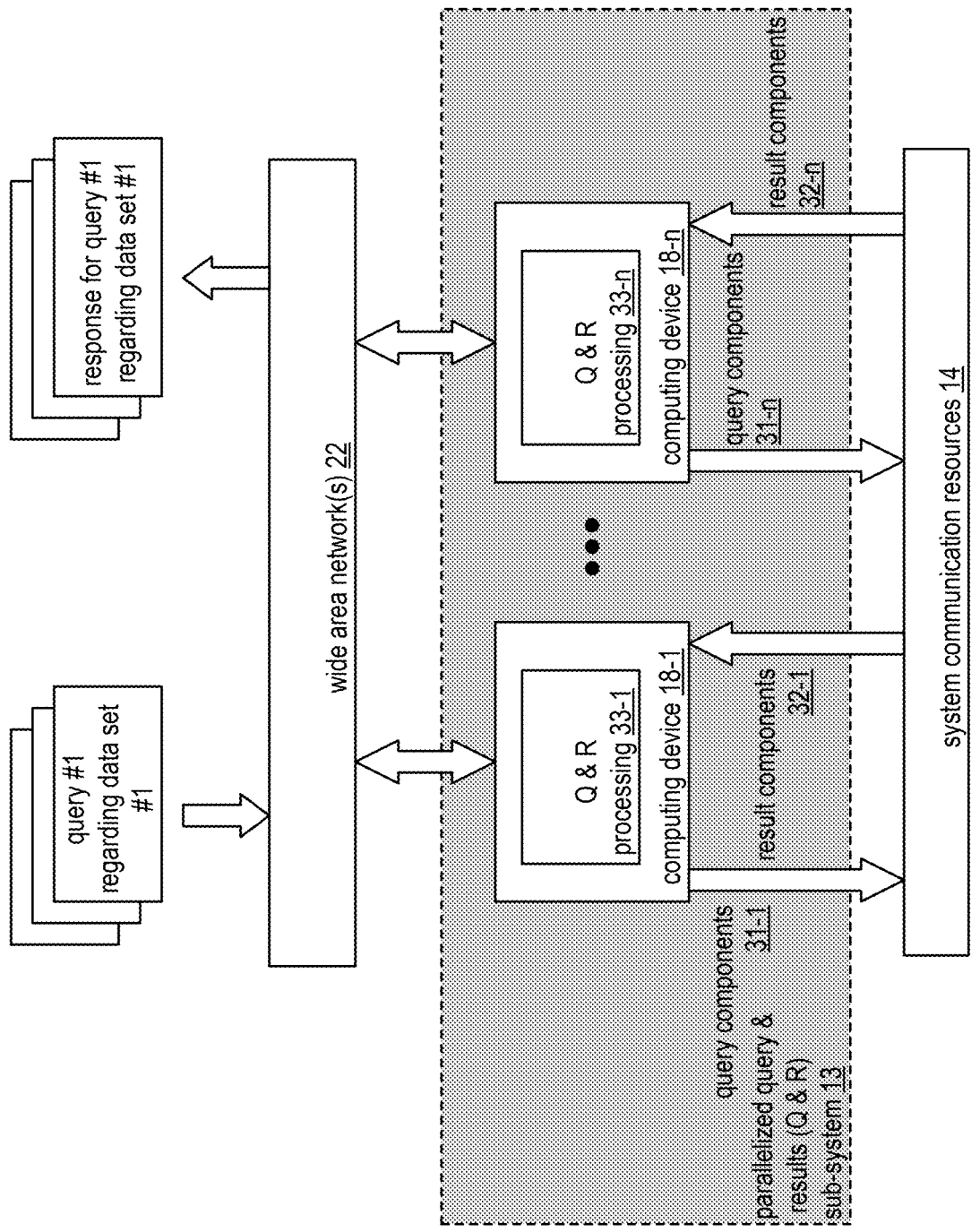
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-$n$. Each of the computing devices executes a query (Q) & response (R) processing function 33-1 through 33-$n$. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-$n$. The computing device of the Q&R sub-system 13 processes the result components to produce a query response.

The Q&R sub-system 13 allows for multiple queries regarding one or more tables to be processed concurrently.

For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
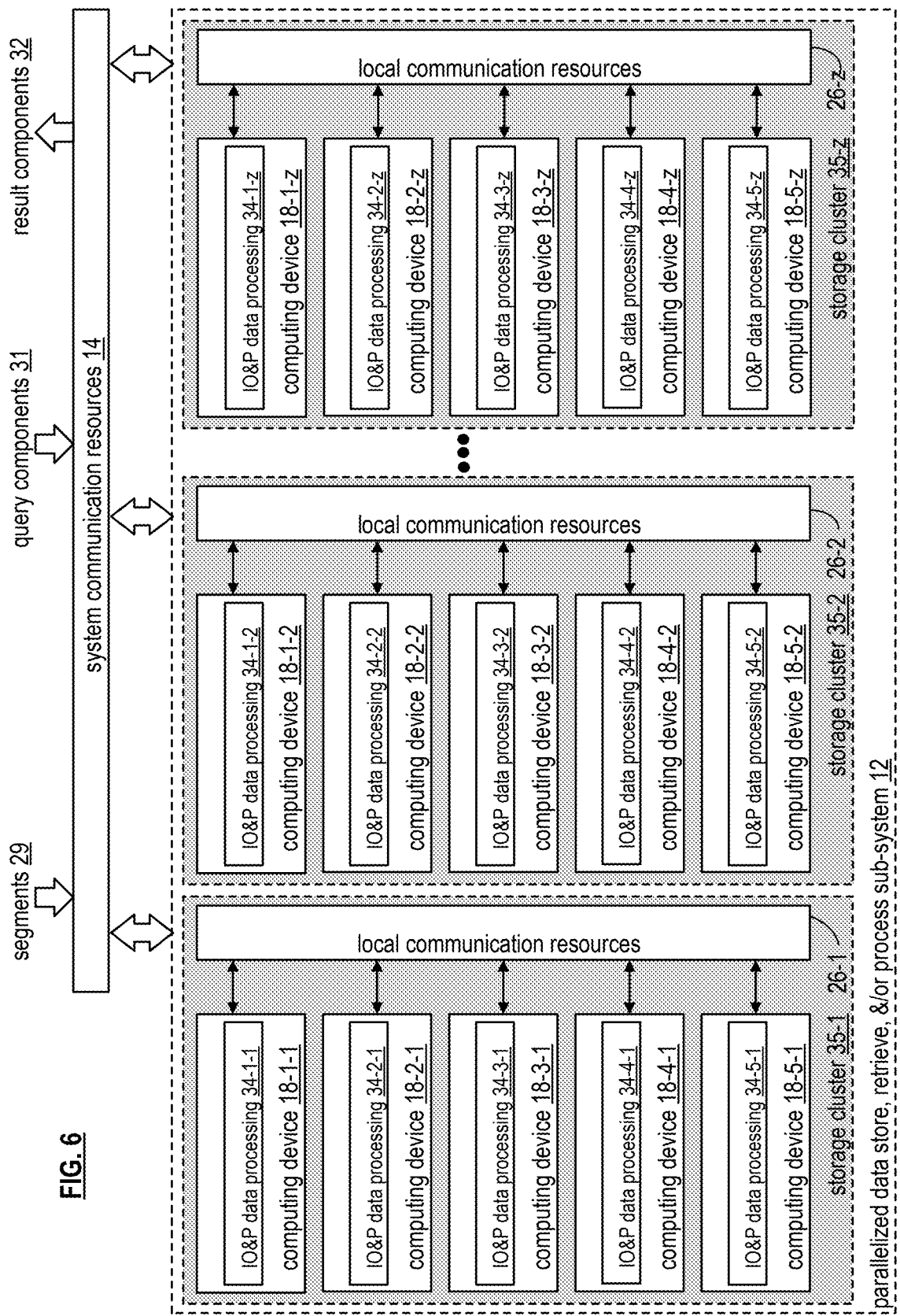
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-$z$. Each storage cluster includes a corresponding local communication resource 26-1 through 26-$z$ and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partition is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-$n$ are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
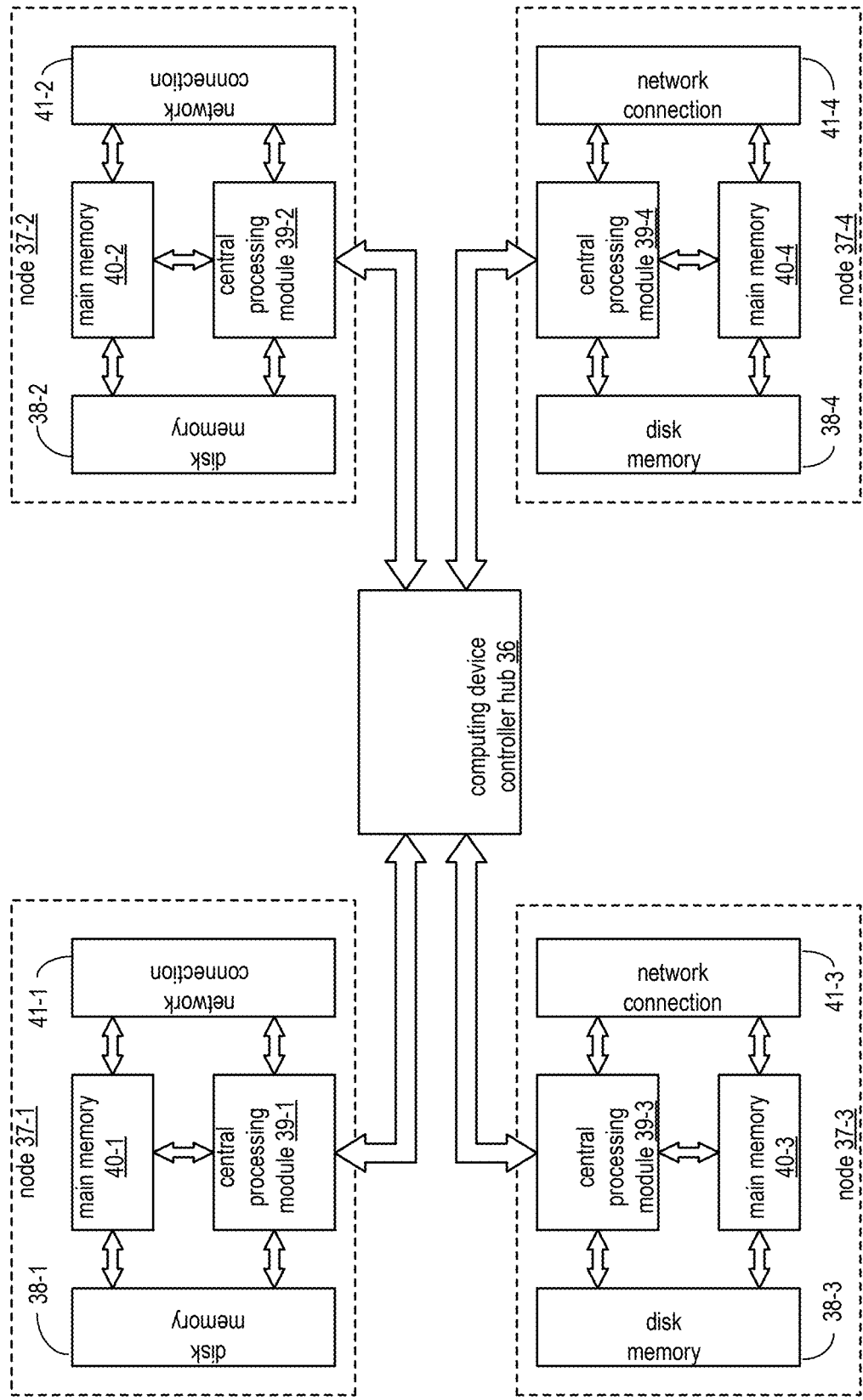
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
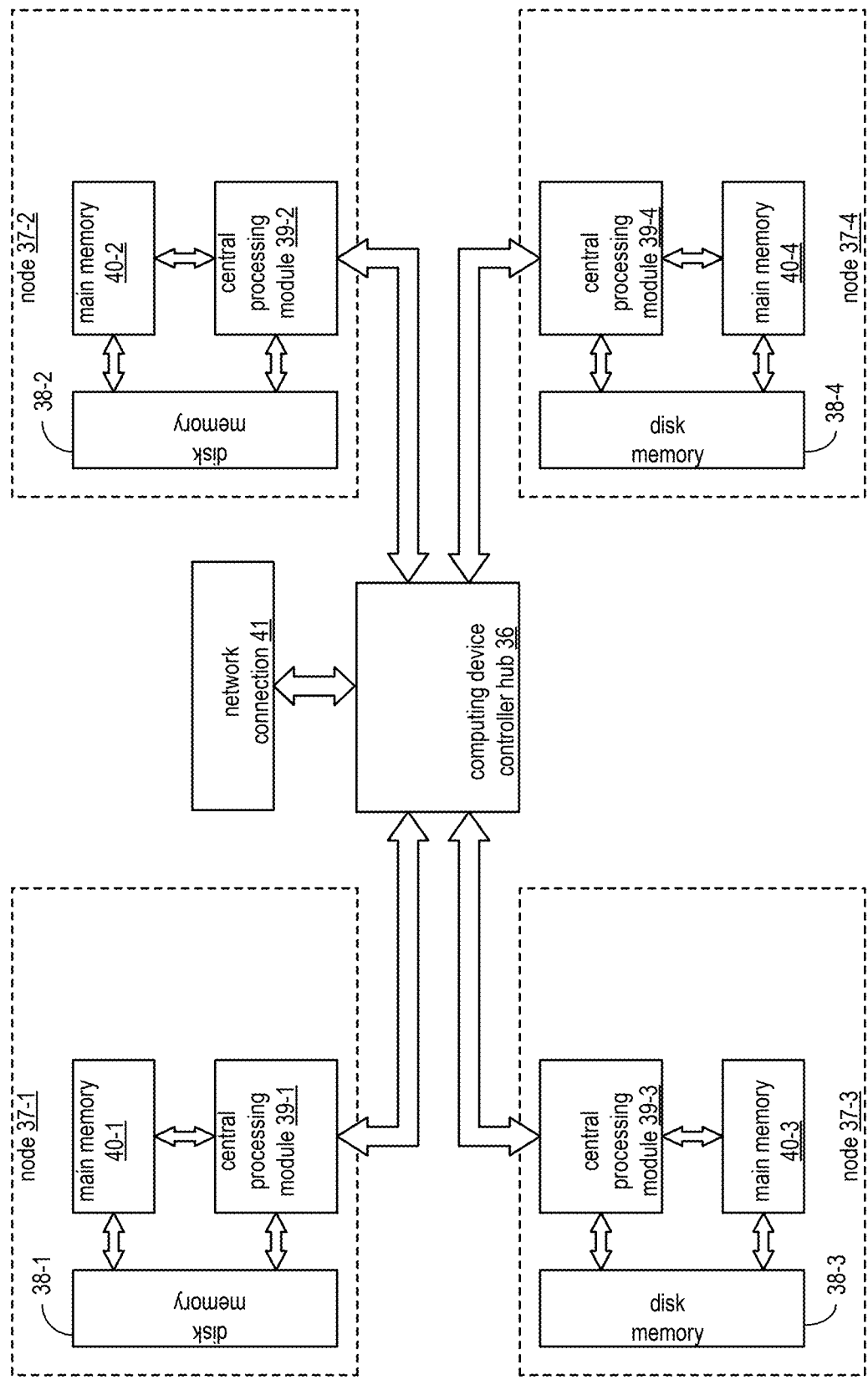
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
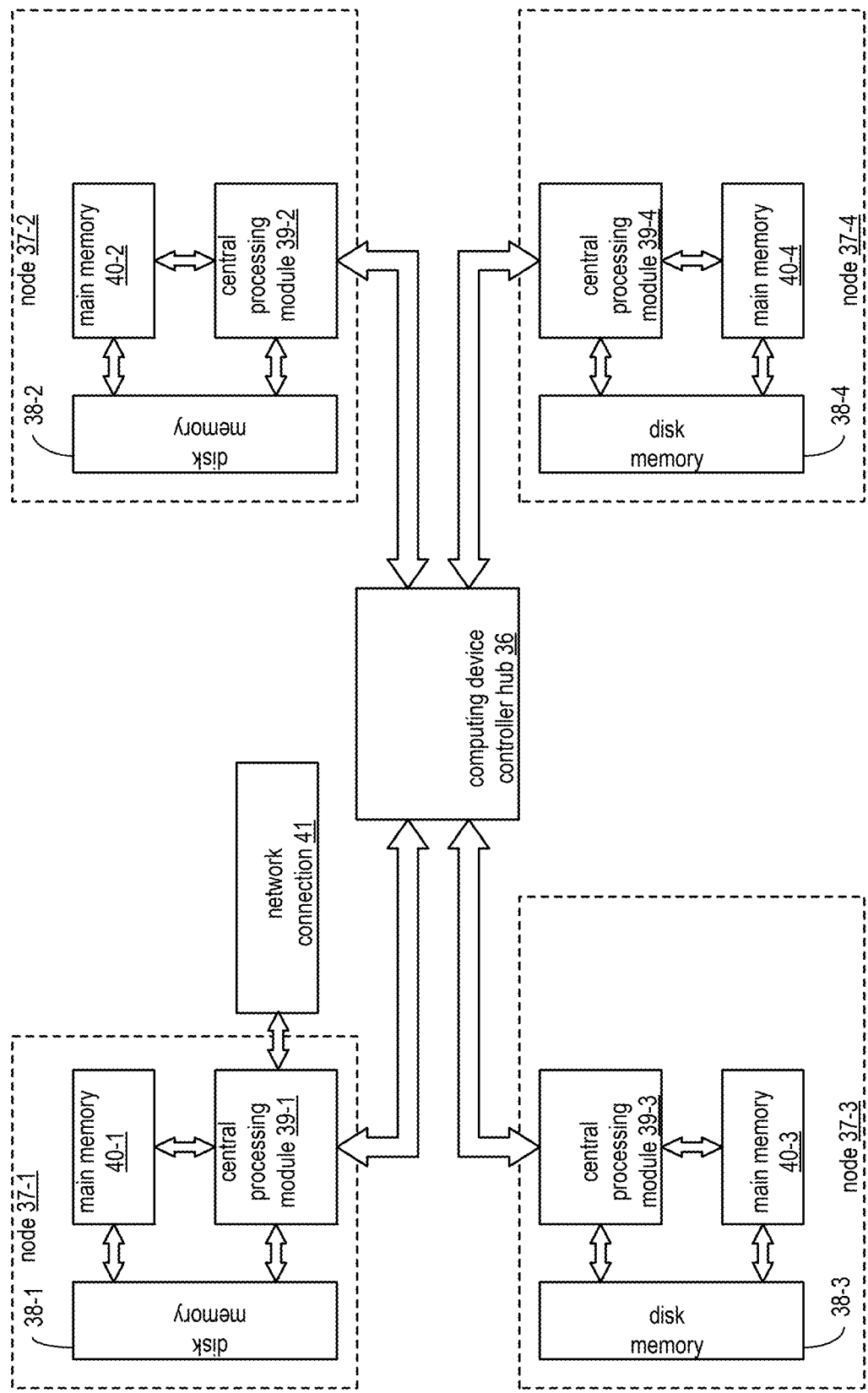
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
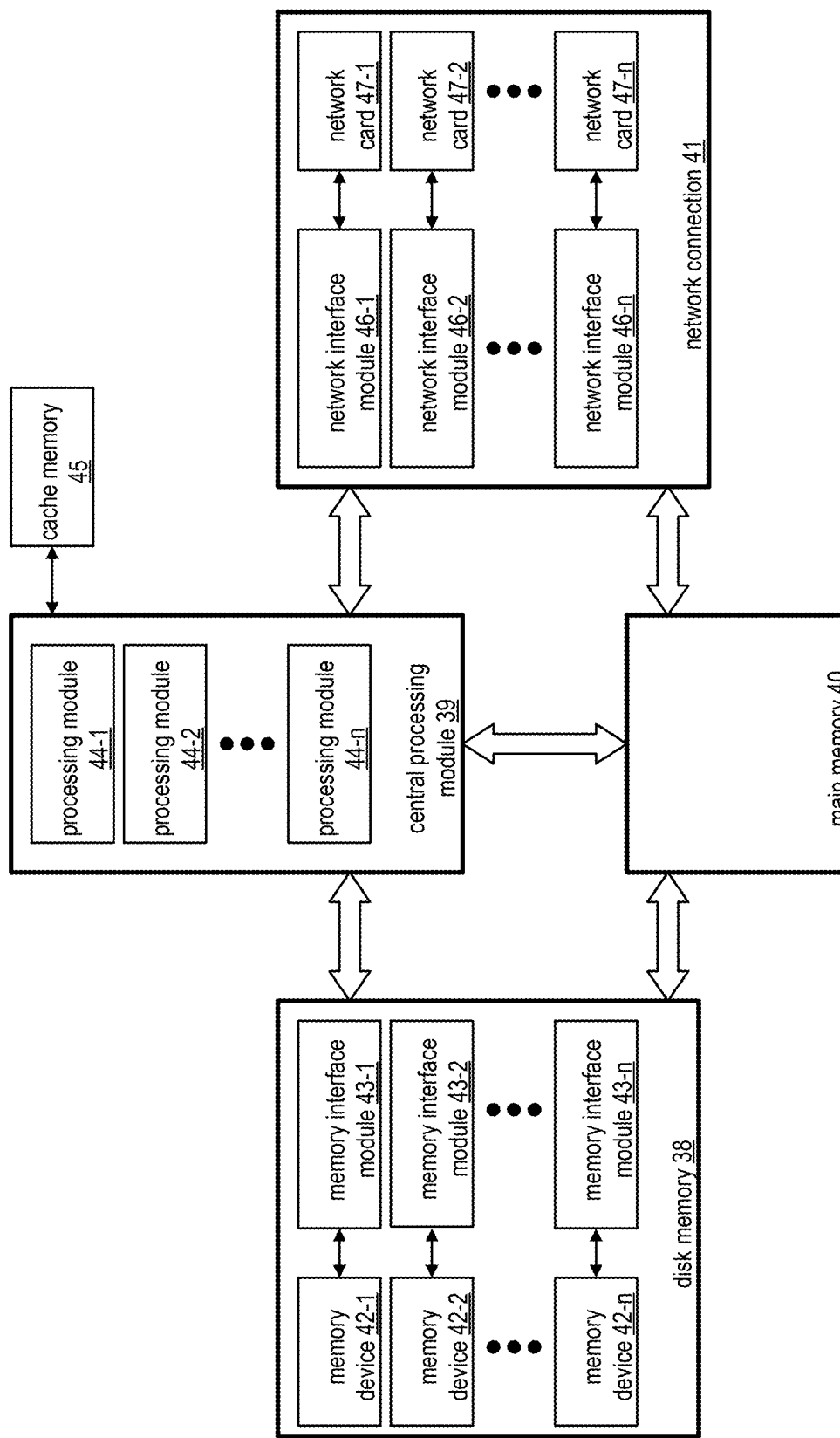
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-$n$ and an associated one or more cache memory 45. A processing module is as defined at the end of the detailed description.

The disk memory 38 includes a plurality of memory interface modules 43-1 through 43-$n$ and a plurality of memory devices 42-1 through 42-$n$ (e.g., non-volatile memory). The memory devices 42-1 through 42-$n$ include, but are not limited to, solid state memory, disk drive memory, cloud storage memory, and other non-volatile memory. For each type of memory device, a different memory interface module 43-1 through 43-$n$ is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-$n$ and a plurality of network cards 47-1 through 47-$n$. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-$n$ include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
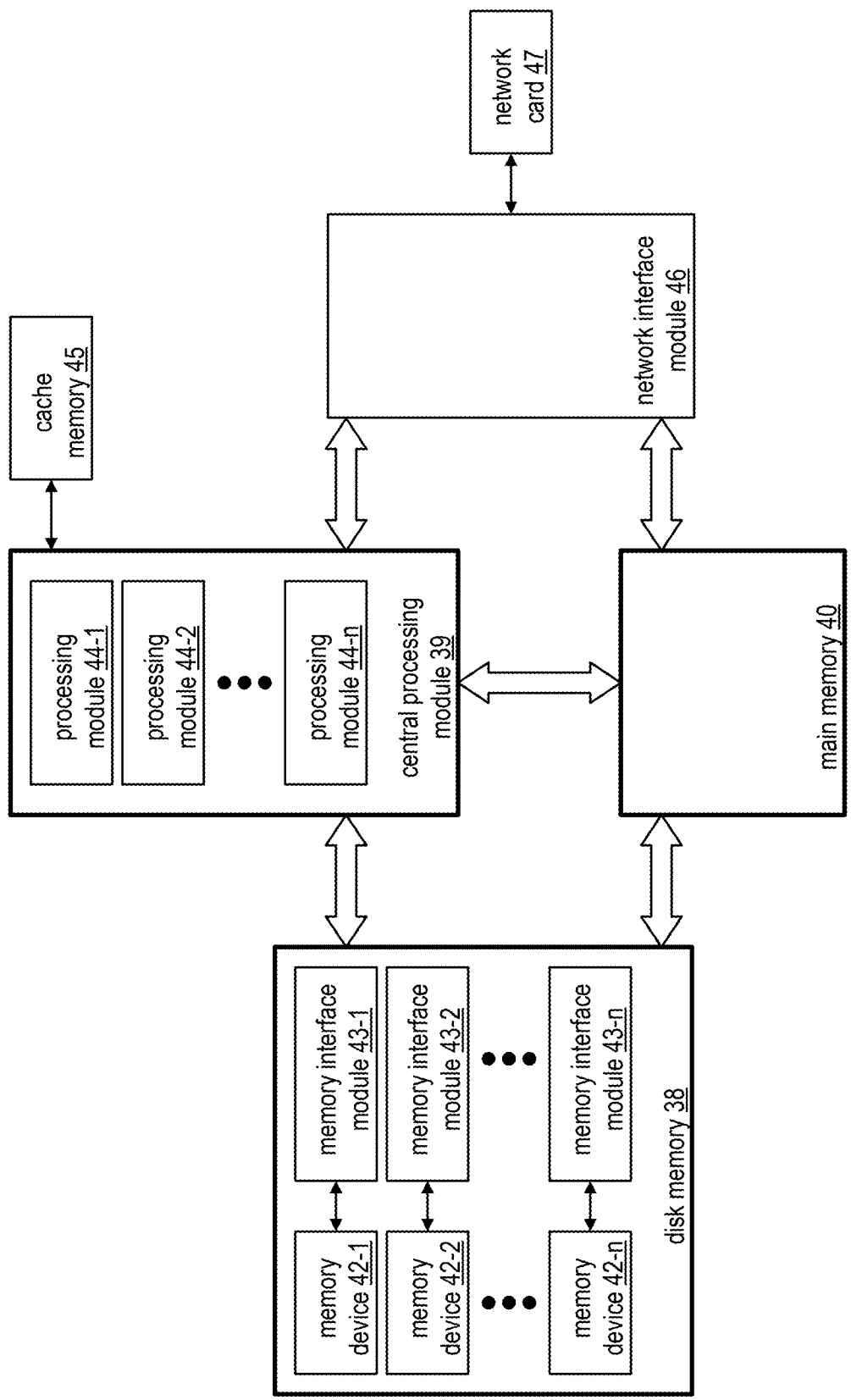
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
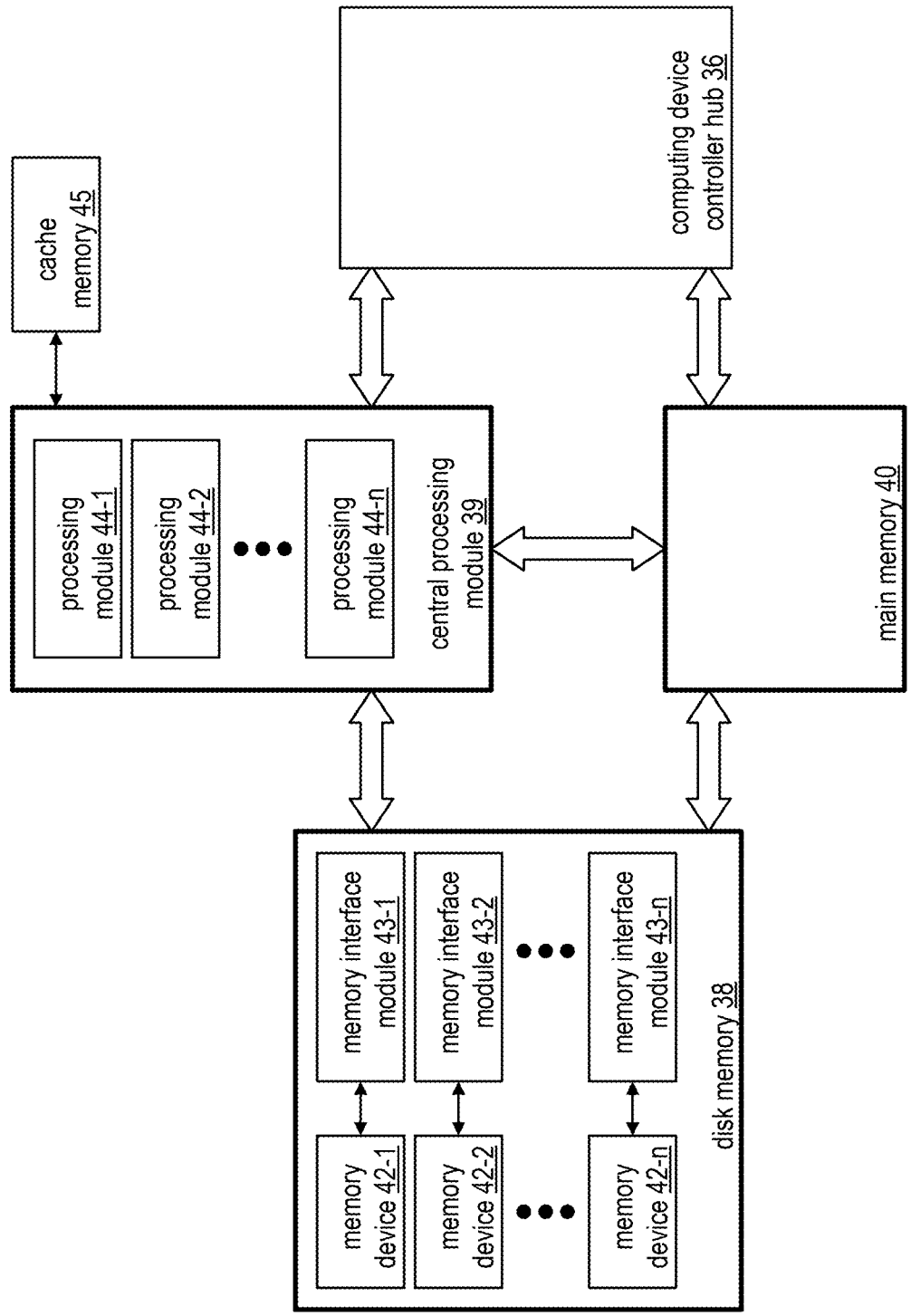
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
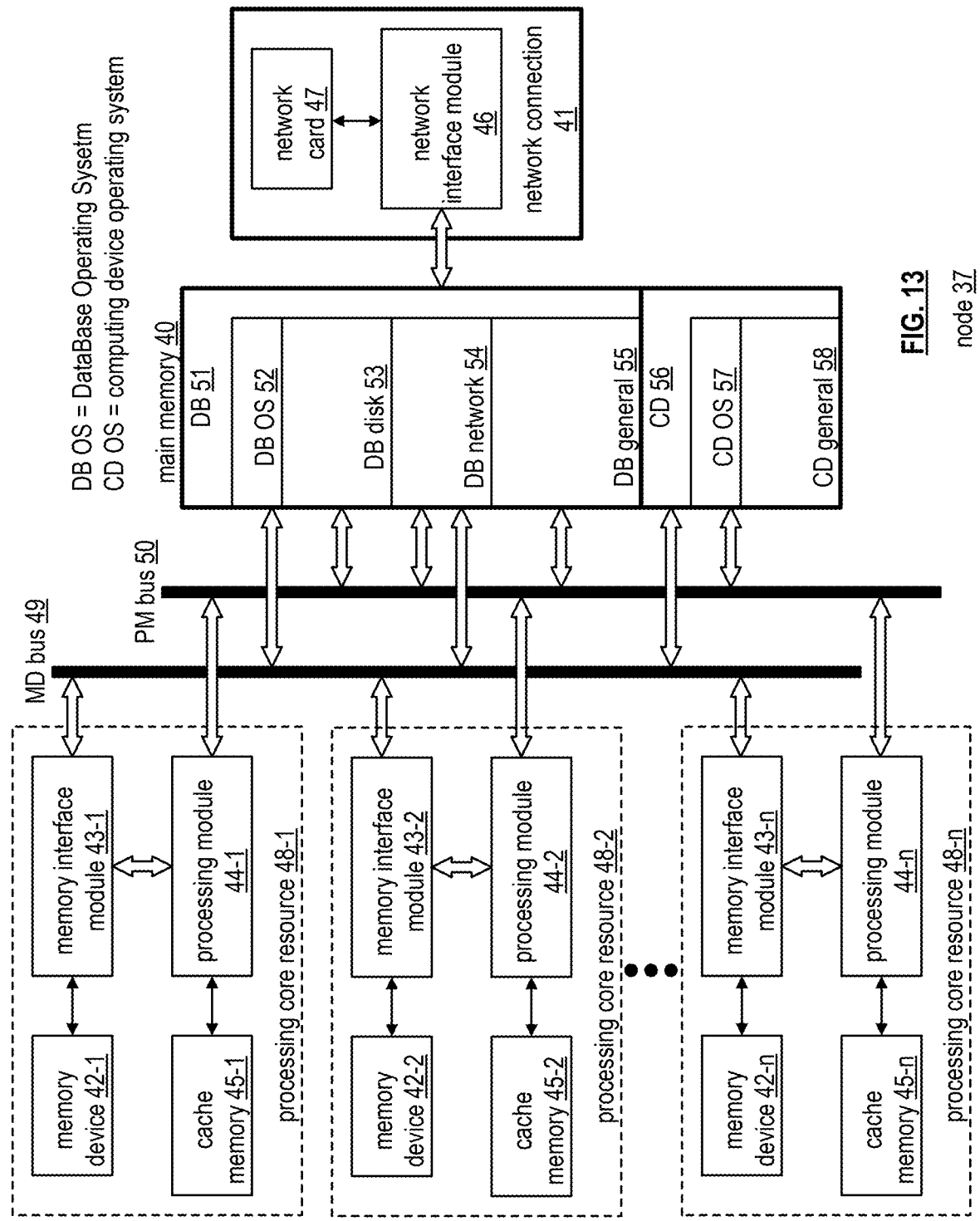
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-$n$, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-$n$, a corresponding memory interface module 43-1 through 43-$n$, a corresponding memory device 42-1 through 42-$n$, and a corresponding cache memory 45-1 through 45-$n$. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
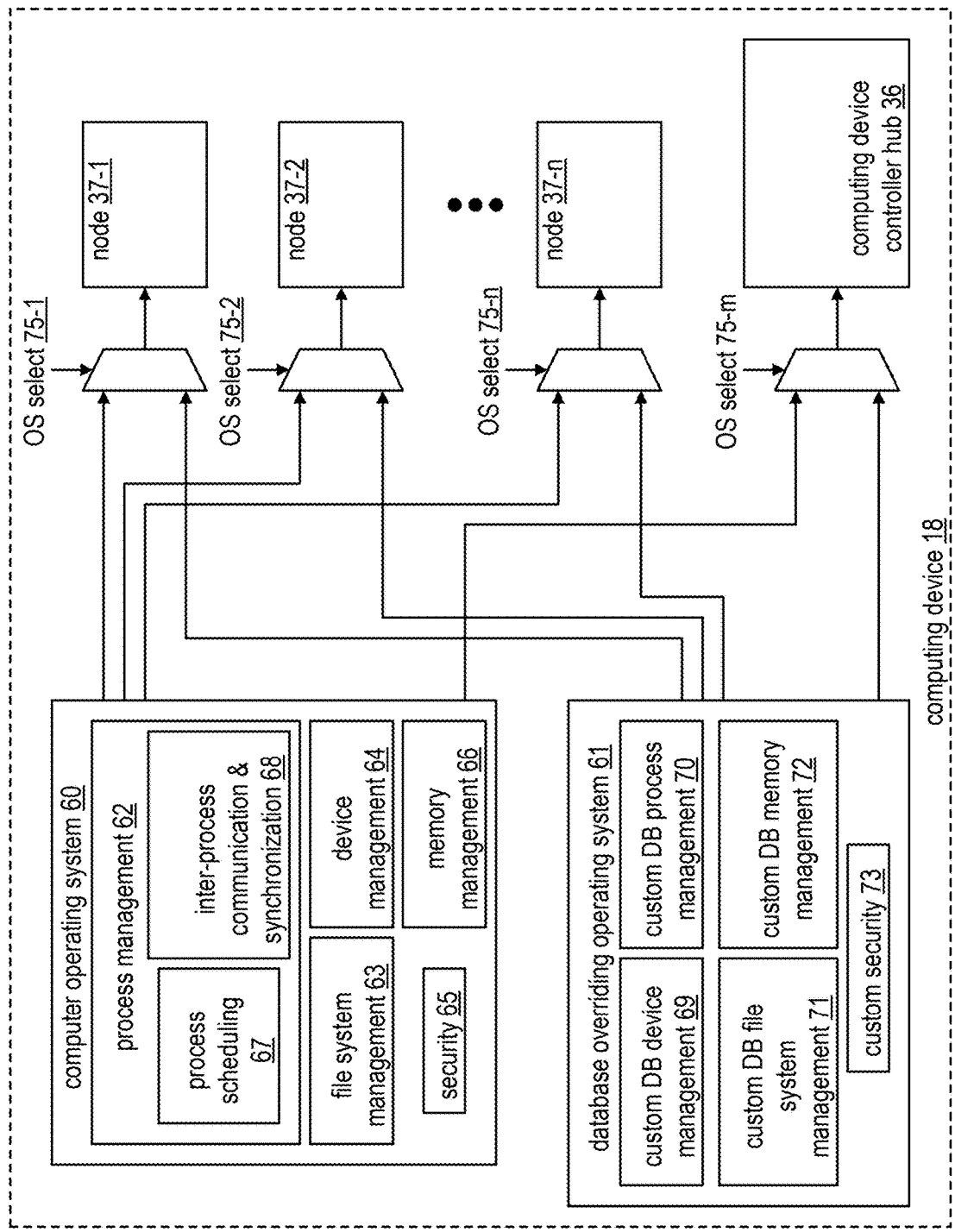
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
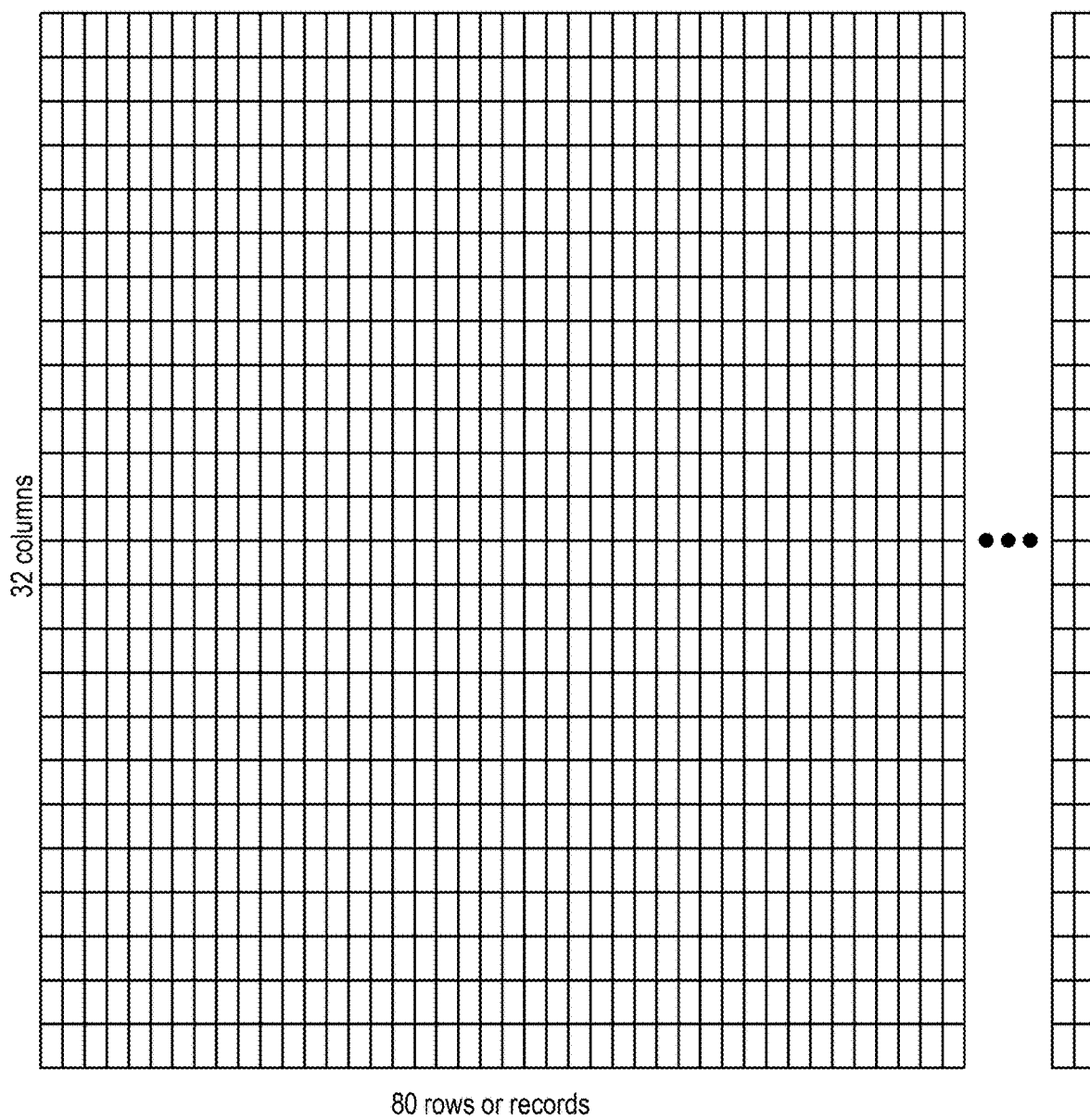

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
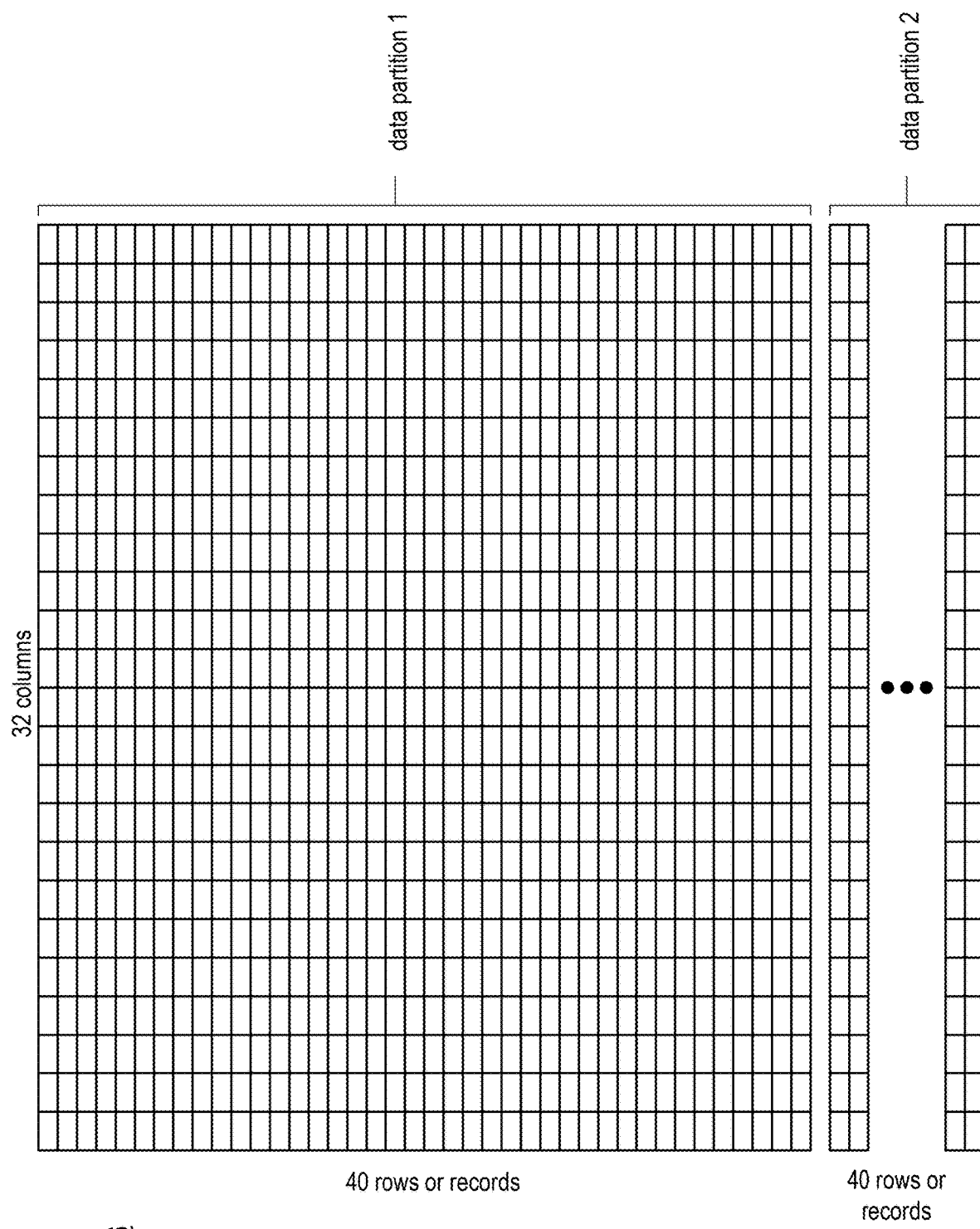

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
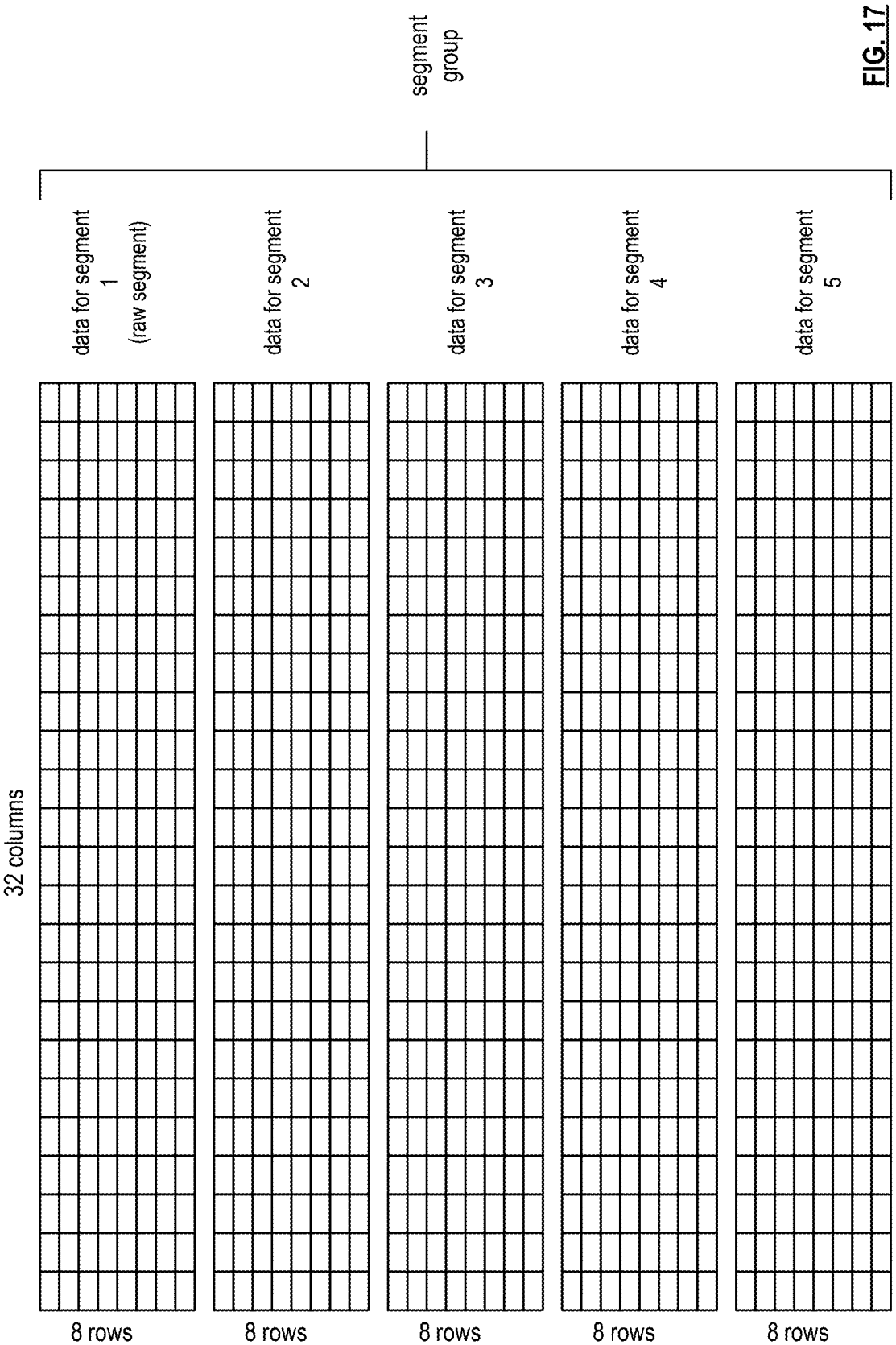

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
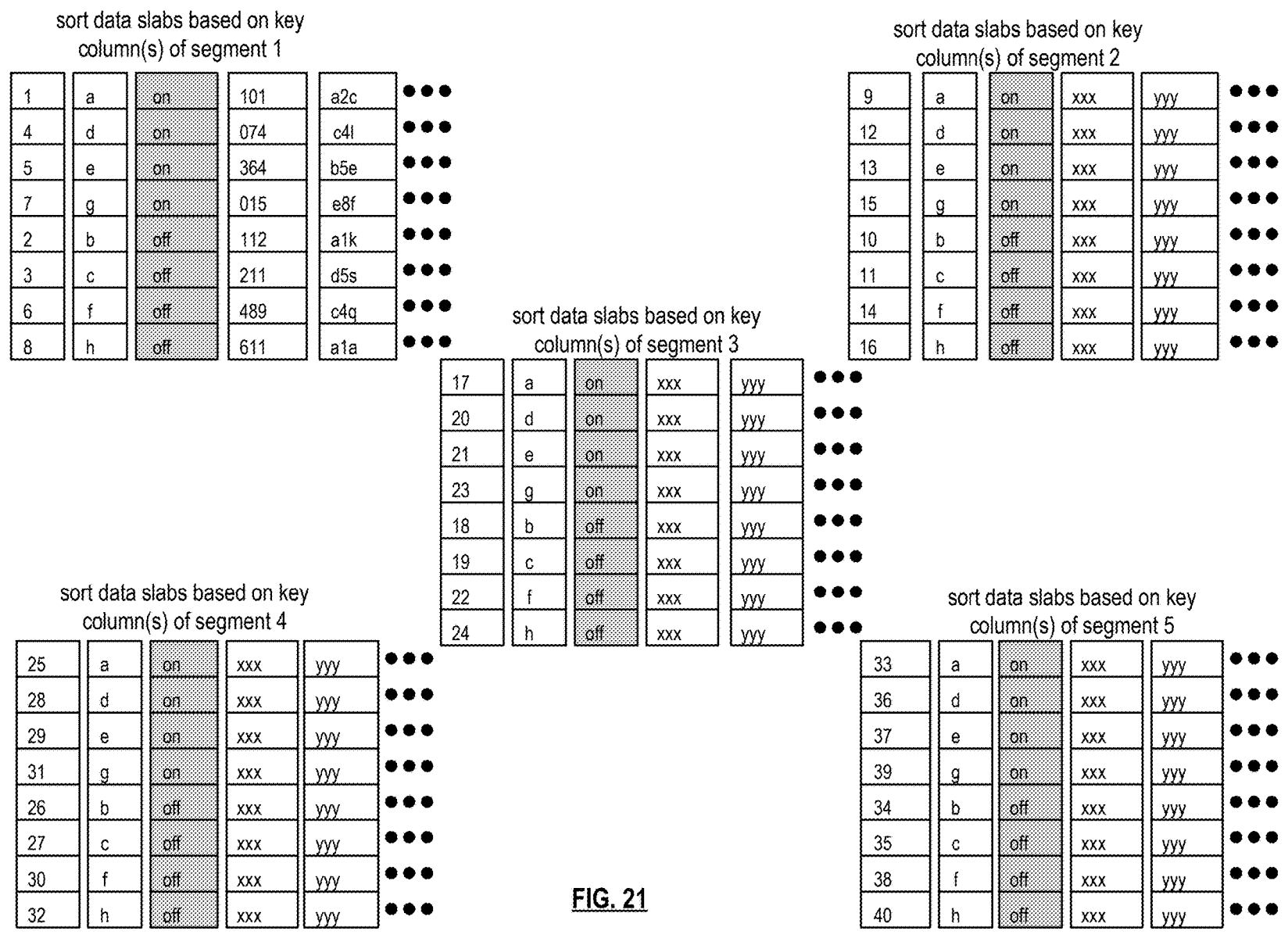

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
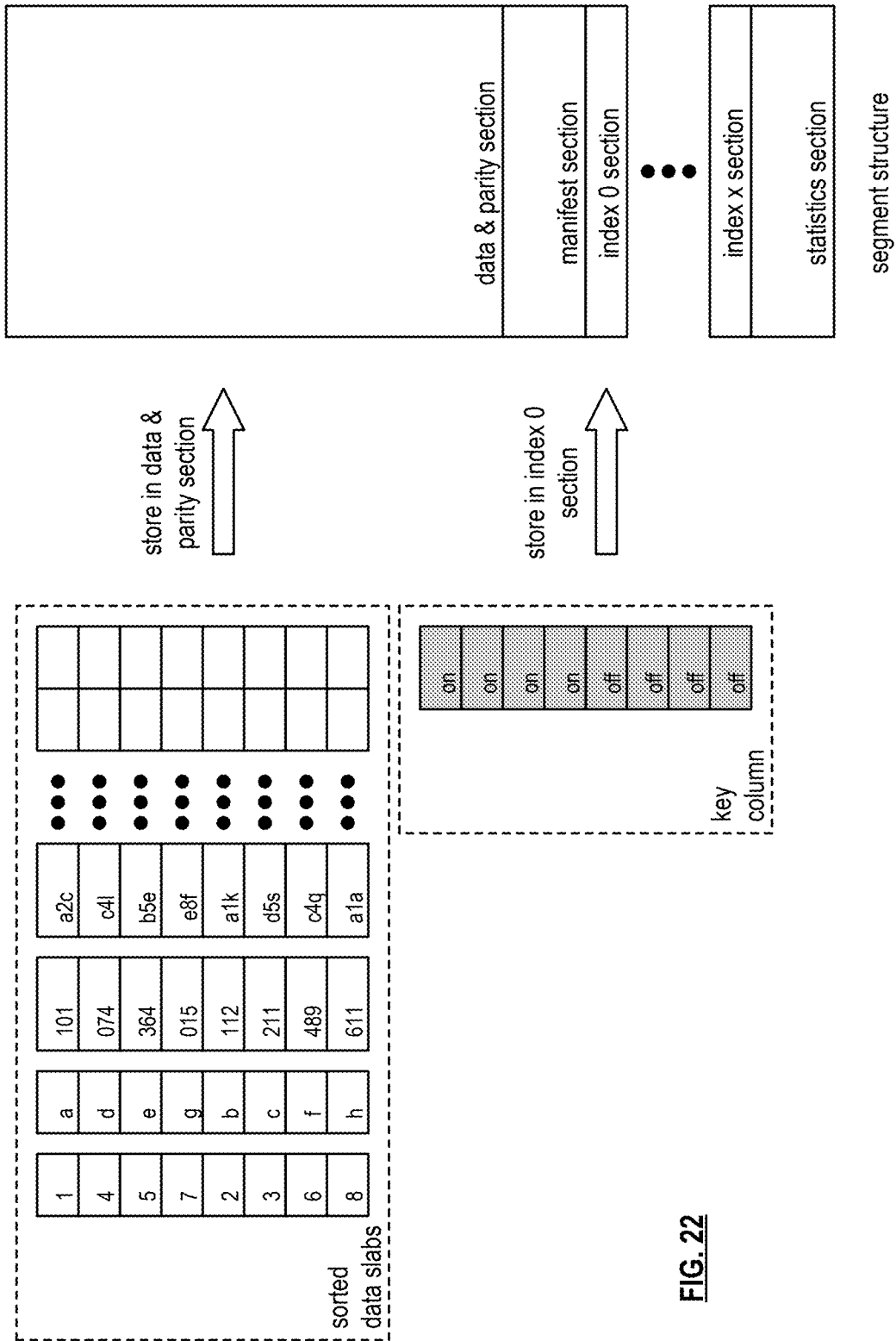

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited to, number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
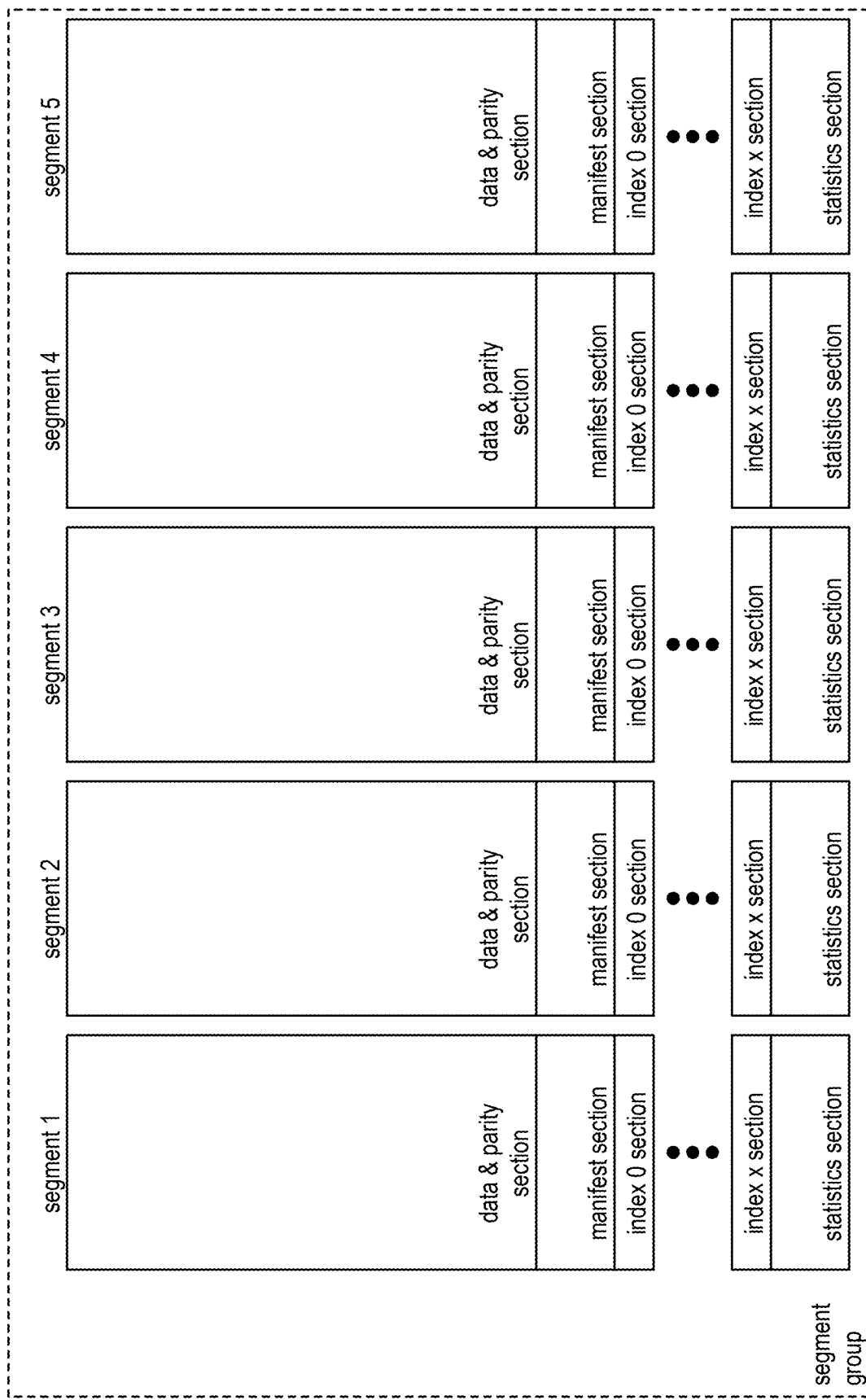

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

FIGS. 24A-24I illustrate embodiments of a data stream processing system 2410. The data stream processing system 2410 can be incorporated within the database system 10 of FIGS. 1-23 and/or can operate in conjunction with the database system 10. For example, some or all features and/or functionality of one or more embodiments of the data stream processing system 2410 of FIGS. 24A-24I can be utilized to implement the parallelized data input system 11. As another example, some or all features and/or functionality of one or more embodiments of the data stream processing system 2410 of FIGS. 24A-24I can be utilized to perform data ingress, where records of a dataset streamed by an incoming data stream are processed by the data stream processing system for storage in the database system 10, and where queries based on these records can be executed against database system 10. In some embodiments, the data stream processing system 2410 is independent from the database system 10. For example, the data stream processing system 2410 can be optionally implemented to process a data stream for transmission to another computing device and/or display via a computing device.

A data stream that includes records to be stored in database system 10 and/or to be displayed, transmitted, and/or otherwise processed can be sent to the data stream processing system 2410. This data stream can be received by the data stream processing system 2410 as incoming message stream 2406, which can include a stream of messages 2405. Each message 2405 can include one or more records, such as one or more database rows for storage in database system 10, and/or can include other data to be stored and/or transmitted once processed by data stream processing system 2410.

This data stream may be emitted by a separate entity, such as one or more stream sources 2402 of FIG. 24A, which can be implemented as one or more computing devices that include one or more transmitters and/or communication interfaces operable to send a stream of data to the data stream processing system 2410. The incoming message stream 2406 can be sent from one or more stream sources 2402 to the data stream processing system 2410 via external networks 17, via system communication resources 14, via one or more wide area networks 22, via any other wired and/or wireless network, and/or via any type of communication connection established between stream source 2402 and data stream processing system 2410. In cases where multiple stream sources 2402 all stream messages 2405, a plurality of stream sources 2402 can each stream their data for processing by the data stream processing system 2410 as multiple, separate incoming message streams 2406 and/or as a combined incoming message stream 2406.

One or more stream sources 2402 can optionally be implemented to stream messages 2405 to the data stream processing system 2410 utilizing the file transfer protocol (FTP) or any other network protocol. One or more stream sources 2402 can be implemented as an object storage service provided via a web service interface, utilized to enable the data stream processing system 2410 to receive messages 2405 via an internet protocol associated with the object storage service. As a particular example, one or more stream sources 2402 can be implemented utilizing Amazon Simple Storage Service (S3). One or more stream sources 2402 can be implemented via any other web services and/or streaming feeds. In cases where multiple stream sources 2402 stream data to the data stream processing system 2410, different stream sources 2402 can be implemented utilizing the same and/or different types of network protocols, web interfaces, and/or streaming APIs.

The incoming message stream 2406 can be sent by the one or more stream sources 2402 in a non-redundant manner. For example, the one or more stream sources 2402 is implemented as a simple push stream and/or provides no means of replaying previously transmitted messages in the case where an error occurs. If such an incoming message stream 2406 were to be simply received and consumed by a simple stream receiver for storage, transmission, and/or display without implementing a fault-tolerant scheme, messages 2405 would be lost and irrecoverable if this simple stream receiver encountered a failure.

It can be ideal and/or necessary for at-least-once processing to be guaranteed for the incoming message stream 2406, where every message 2405 of incoming message stream 2406 is guaranteed to be stored, transmitted, displayed, and/or otherwise processed at least once. To guarantee at-least-once processing for data received in a non-redundant data stream, a fault-tolerant scheme can be employed by the data stream processing system 2410. In particular, the data stream processing system 2410 can be operable to consume a non-redundant incoming message stream 2406 in a fault-tolerant manner that achieves at-least-once processing of messages 2405 of incoming message stream 2406. For example, the data stream processing system 2410 produces an outgoing message stream 2408 for storage, transmission, and/or further processing in accordance with a fault-tolerant scheme, where outgoing message stream 2408 is guaranteed to include all messages 2405, is replay-able, and/or has a level of redundancy that is improved from the redundancy of the redundancy of incoming message stream 2406. This improves the technology of database systems by ensuring that incoming data streams are consumed in a fault-tolerant fashion guaranteeing that all records are received and stored properly, despite being received in a non-redundant fashion. This improves the technology of database systems by allowing data streams sent by non-redundant sources to be stored reliably, rather than requiring that this external source transmit its data differently and/or electing to not consume this data based on the source being non-redundant. This improves the technology of data streaming and/or data processing applications by ensuring that incoming data streams are consumed in a fault-tolerant fashion, to guarantee that all records are received, transmitted, displayed, and/or otherwise processed without inadvertently dropping data, despite being received in a non-redundant fashion.

In some embodiments, the data stream processing system 2410 is implemented to consume only non-redundant data streams, for example, where another data stream processing system is utilized to consume other, redundant data streams, and/or where this other data stream processing system optionally does not employ some or all of the fault-tolerant mechanisms described in conjunction with FIGS. 24A-24I because the originating source is already sending the stream in a redundant fashion. In some embodiments, the data stream processing system 2410 is implemented to consume some or all data streams, regardless of whether they are already redundant.

In some embodiments, different levels of fault-tolerance can be configured by a user and/or can be automatically selected for different stream sources 2402 based on the level of redundancy provided by each data source in emitting its data stream as incoming message stream 2406. For example, higher levels of fault-tolerance are utilized for stream sources 2402 that send their data streams in accordance with low redundancy and/or no redundancy to generate outgoing message stream 2408, while lower levels of fault-tolerance are utilized for stream sources 2402 that send their data streams in accordance with higher redundancy to generate outgoing message stream 2408.

In some embodiments, a fixed, required redundancy level is configured via user input, is automatically selected, and/or is otherwise determined. All incoming data streams can be required to be consumed in accordance with at least the required redundancy level. In such cases, no additional redundancy is applied for some incoming data streams that already meet and/or surpass the required redundancy level, while redundancy is improved to meet the required redundancy level via data stream processing system 2410 for other incoming data streams do not meet the required redundancy level, for example, based on having lower levels of fault-tolerance than the required redundancy level and/or no fault-tolerance at all.

A data stream processing system 2410 can achieve this fault-tolerance by utilizing a plurality of feed receiver modules 2420.1-2420.Z in a feed receiver set 2425, as illustrated in FIG. 24A. Some or all features and/or functionality of the data stream processing system 2410 of FIG. 24A can be utilized to implement the data stream processing system 2410 of any embodiments of FIGS. 24B-24I, and/or can be utilized to implement some or all of the parallelized data input sub-system 11 of FIG. 4.

Each of the plurality of feed receiver modules 2420.1-2420.Z can be implemented via one or more distinct computing devices 18 and/or can be physically separated, for example, to reduce the chances that multiple feed receiver modules 2420 encounter outages due to a same failure. For example, each of the plurality of feed receiver modules 2420.1-2420.Z are implemented via different nodes 37 on different servers.

In some embodiments, each feed receiver module 2420 is optionally implemented as its own ingress data sub-system 25, where the plurality of feed receiver modules 2420.1-2420.Z of feed receiver set 2425 correspond to the set of ingress data sub-systems 25-1-25-$p$ of the parallelized data input sub-system 11 of FIG. 4. In some embodiments, each feed receiver module 2420 is optionally implemented as its own ingress data processing 28 of a given computing device 18, where the plurality of feed receiver modules 2420.1-2420.Z of feed receiver set 2425 correspond to the set of ingress data processing 28 of a given ingress data sub-system 25 of FIG. 4. In such cases, data ingress for database system 10 can be achieved via a set of data stream processing systems 2410-1-2410-$p$ that each implement a corresponding one of the ingress data sub-system 25-1-25-$p$ of FIG. 4.

Each message 2405 can include and/or indicate one key 2416 of a plurality of possible keys. For example, the messages 2405 each correspond to a record of a dataset, such as a row of a database table, where the key 2416 of a given message corresponds to the value of a key column of the dataset, such as the key column described in conjunction with FIGS. 18-23, and/or any other predetermined column of the dataset. In other embodiments, the key 2416 can be otherwise extracted from and/or derived from the message 2405. In some embodiments, the key 2416 of a given message 2405 is determined by performing a hash function upon some or all data in message 2405.

Different feed receiver modules 2420 of feed receiver set 2425 can each process different subsets of the incoming message stream in accordance with key assignment data 2415. The key assignment data 2415 can indicate assignment of different keys 2416 to different feed receiver modules, indicating which messages should be processed, cached, and emitted by each feed receiver module.

The key assignment data 2415 can be generated by the data stream processing system 2410; can be stored in memory accessible by data stream processing system 2410; can be received by data stream processing system 2410; and/or can be otherwise determined by data stream processing system 2410. For example, a distributed configuration service such as Apache Zookeeper can be utilized to implement and/or can communicate with the data stream processing system 2410 to generate and/or supply the key assignment data 2415 to the plurality of feed receiver modules 2420.1-2420.Z. Another entity that communicates with the data stream processing system 2410, such as the feed receiver set management module of FIG. 24D and/or one or more other computing devices 18, can generate key assignment data 2415 and/or facilitate communication of key assignment data 2415 to each of the plurality of feed receiver modules 2420.1-2420.Z.

As another example, the feed receiver modules 2420 each generate the key assignment data 2415, and/or their own relevant portions of the key assignment data 2415, based on shared state information by applying a same assignment function, such as a same consistent hashing function. In such cases, the distributed configuration service can be utilized to implement and/or can communicate with the data stream processing system 2410 to generate and/or supply the shared state information to the plurality of feed receiver modules 2420.1-2420.Z. Such embodiments are discussed in further detail in conjunction with FIGS. 24D and 24E.

The key assignment data 2415 can indicate, for every given key 2416 in a set of keys 2416.1-2416.J, a single feed receiver module 2420 assigned as the owner 2418 of the given key 2416 and one or more feed receiver modules 2420 assigned as followers 2419 of the given key 2416. This set of keys can span a full keyspace 2417. For example, the keyspace 2417 corresponds to the domain of all possible values of a corresponding key column of a dataset, where messages 2405 each include rows and/or records of the dataset with values for multiple corresponding columns of the dataset including the key column.

Each key 2416 can correspond to a single, discrete value in keyspace 2417. Alternatively, each key 2416 can correspond to multiple discrete and/or continuous values of keyspace 2417, such as a span of continuous values of keyspace 2417. For example, consider a keyspace that includes all positive values between 0 and 10,000. One given key 2416 can correspond to a continuous subset of this keyspace 2417, such as the set of values starting at and including 10, up to and not including 20. Another given key 2416 can correspond to another continuous subset of this keyspace 2417, such as the set of values starting at and including 20, up to and not including 30. Any such continuous or non-continuous subsets of multiple possible key values can be jointly assigned to a same owner and same set of followers as a single key 2416. The set of keys 2416.1-2416.J can be mutually exclusive and collectively exhaustive with regards to the keyspace 2417, and/or can otherwise include all possible values of the key without duplicates.

For any given key 2416, the set of feed receivers assigned as followers 2419 of the given key 2416 can all be distinct from each other and/or can all be distinct from the owner 2418 of the given key 2416. In some embodiments, every key 2416 has a same number M of feed receivers assigned as followers 2419. For example, the level of fault-tolerance achieved by data stream processing system 2410 is an increasing function of M, based on M being the number of recoverable failures. As a particular example, the feed receiver set 2425 can enable N+M redundancy when the number of followers is equal to M, where N is the minimum number of active feed receiver processes needed to maintain low latency consumption of the data feeds. The number of feed receivers in the feed receiver set 2425 can be greater than M+1 and/or can be significantly greater than M.

Each feed receiver module 2420 can utilize the key assignment data 2415 to determine which keys 2416 it is assigned to own as an owner 2418, and/or which keys it is assigned to follow as a follower 2419. For example, each given feed receiver module 2420 generates, accesses, receives, and/or otherwise determines some or all of the key assignment data 2415, for example, based on communication with a distributed configuration service. In some embodiments, each given feed receiver module 2420 generates, accesses, receives, and/or otherwise determines only the pertinent information of key assignment data 2415 indicating: an owned set of keys indicating all keys 2416 to which the given feed receiver module 2420 is an owner 2418, and a followed set of keys to which it is a follower 2419.

Any given feed receiver module 2420 can be the owner 2418 of a single key, can be the owner 2418 of multiple different keys 2416, and/or can be the owner 2418 of no keys 2416 in the key assignment data 2415. Any given feed receiver module 2420 can be a follower 2419 of a single key, can be a follower 2419 of multiple different keys 2416, and/or can be the follower 2419 of no keys 2416 in the key assignment data 2415.

Each given feed receiver module 2420 can process a message subset 2422 that includes ones of the messages 2405 in incoming data stream 2506 with keys 2416 to which the given feed receiver module 2420 is assigned as an owner 2418 or follower 2419 in the key assignment data 2415. For example, message subset 2422 is received, processed, and/or determined by each given feed receiver module 2420 based on subscribing to and/or otherwise electing to receive and/or process only ones of the messages 2405 with keys 2416 to which the given feed receiver module 2420 is assigned as an owner 2418 or follower 2419 in the key assignment data 2415. In some cases, each given feed receiver module 2420 receives the entire incoming message stream 2406, and filters the incoming message stream 2406 to process only the only ones of the messages 2405 with keys 2416 to which the given feed receiver module 2420 is assigned as an owner 2418 or follower 2419 in the key assignment data 2415. In cases where each key has one owner 2418 and M followers 2419, each message 2405 is thus received and processed by only M+1 feed receiver modules 2420.

Each given feed receiver module 2420 can emit its own stream of emitted messages 2424 by emitting only ones of the messages 2405 in its message subset 2422 with keys 2416 to which the given feed receiver module 2420 is assigned as an owner 2418. As each key has exactly one owner 2418, the combined stream of emitted messages 2424.1-2424.Z across the set of feed receiver modules 2420.1-2420.Z renders an outgoing message stream 2408 identical to the incoming message stream in the case of no failure, where each message is only included in the outgoing message stream once based on being emitted by its one owner. In some embodiments, the sets of emitted messages 2424.1-2424.Z are sent to and/or produced into a stream-processing software platform for further streaming and/or consumption, such as the central data streaming module 2450. For example, the sets of emitted messages 2424.1-2424.Z are produced to a distributed streaming platform and/or event streaming platform, such as Apache Kafka.

Furthermore, because each of the feed receiver modules 2420 also receives messages 2405 with keys to which it is assigned as a follower 2419, fault-tolerance can be achieved in the case where a feed receiver module 2420 fails, where this feed receiver modules 2420 is assigned as an owner 2418 of one or more keys. In particular, messages 2405 with keys 2416 to which the given feed receiver module 2420 is assigned as a follower 2419 are maintained in memory of the feed receiver module 2420, for example, for a predetermined amount of time before being discarded. This ensures that these messages are preserved and are thus recoverable in the case where the feed receiver assigned as a corresponding owner 2418 fails and/or undergoes an outage. In particular, as each message is received and queued by M+1 feed receiver modules 2420 when the predefined number of followers is M, recovery can be guaranteed for up to M failures, corresponding outage of up to M feed receiver modules 2420.

When such a failure of a feed receiver module 2420 occurs, the key assignment data 2415 can be regenerated to replace the owner of each key 2416 where this failed feed receiver module was previously assigned as the owner 2418 in the current key assignment data. In the regenerated key assignment data 2415, the failed owner 2418 is replaced by one of its corresponding followers 2419. As each of these new owners previously received and stored all messages with their newly owned one or more keys as previous followers of these one or more keys, some or all of these previously received messages can be retrieved from memory and can be emitted as part of the new owner's emitted messages 2424. This ability to recover messages meant to be emitted by a failed feed receiver module provides outgoing message stream 2408 with the fault-tolerance and at-least-once processing guarantee that was not achieved by incoming message stream 2406.

In some embodiments, when current key assignment data 2415 is regenerated to reassign a particular owner 2418 of one or more keys based on the corresponding feed receiver module 2420 undergoing a failure, the new owner 2418 of the regenerated key assignment data 2415 for each of these of one or more keys is guaranteed to be a follower of the corresponding key in the current key assignment data 2415, thus ensuring that the new owner can recover and emit any messages it had already followed. For example, this guarantee is achieved via a key assignment data generation scheme utilized to generate each iteration of the key assignment data 2415 over time, for example, as feed receiver modules 2420 become unavailable, are removed, again become available, and/or are added. As a particular example, the key assignment data 2415 is generated in accordance with a consistent hashing scheme, such as a consistent hashing function and/or algorithm that implements the key assignment data generation scheme, where key assignment data 2415 is regenerated over time as necessary in accordance with this consistent hashing scheme to guarantee the new owners of any given key in regenerated key assignment data 2415 as a prior follower of the given key in the previous key assignment data 2415.

In some embodiments, when current key assignment data 2415 is regenerated to reassign a particular owner 2418 of one or more keys based on the corresponding feed receiver module 2420 undergoing a failure, the number of followers in the current key assignment data 2415 can be maintained to be exactly M followers. This can involve selection of a new follower from the set of feed receiver modules 2420 that is not already a follower, and/or that is not the current owner that failed. For example, this guarantee of M followers for all keys 2416 in any regeneration of key assignment data 2415 is achieved via the key assignment data generation scheme utilized to generate each iteration of the key assignment data 2415 over time, such as a consistent hashing scheme that implements the key assignment data generation scheme.

In some embodiments, the set of followers for each key 2416 in key assignment data 2415 is an ordered list of followers. In such cases, a first follower and/or most favorably ordered follower of a key 2416 in current key assignment data 2415 can become the new owner in regenerated key assignment data 2415, for example, based on the owner of this key in current key assignment data 2415 requiring replacement. In such cases, a second most favorably ordered follower in current key assignment data 2415 can become the first follower and/or most favorably ordered follower in regenerated key assignment data 2415, a third most favorably ordered follower in current key assignment data 2415 can become the second follower and/or second most favorably ordered follower in regenerated key assignment data 2415, and so on. For example, this guarantee that followers progressively increasing their ranking up until becoming an owner over multiple iterations of regenerating followers for these keys 2416 in regeneration of key assignment data 2415 over time is achieved via the key assignment data generation scheme utilized to generate each iteration of the key assignment data 2415 over time, such as a consistent hashing scheme that implements the key assignment data generation scheme. In particular, a given feed receiver module that is a least favorably ranked follower of a given key can be guaranteed to take ownership of the kay if and only if the current owner, and all M−1 other followers of the key, all eventually become unavailable while this given feed receiver module is still available. This guarantee can further improve the technology of data stream consumption by further improving fault-tolerance of the data stream processing system, as the follower selected as the new owner for a given key will always correspond to feed receiver module 2420 that followed the given key for the longest span of time, and can thus have a longest history of messages for the given key that can be salvaged for retransmission as necessary.

In some embodiments, a new follower of this key, for example, selected to maintain the same number of followers M in the regenerated key assignment data 2415, can automatically be the last follower and/or least favorably ordered follower in the regenerated key assignment data 2415. In particular, as this new follower will be following the given key for the least amount of time, the other M−1 are prioritized to be reassigned as owners before this new follower, for example, in M−1 further regenerations of the key assignment data. As a particular example, if a previously owner of a given key that was replaced due to failure becomes available, rather than immediately reinstating its role as the new owner of the given key, it can become a less highly prioritized follower when it is first reinstated, such as this last follower and/or least favorably ordered follower in the regenerated key assignment data 2415. This can be favorable, as this newly reinstated feed receiver module owner does yet have any stored messages for the corresponding key based on not currently being a follower. This can optionally include identifying newly reinstated feed receiver modules 2420 with new identifiers that are different than prior identifiers for use in a consistent hashing scheme or other hashing scheme of the key assignment data generation scheme.

In some cases, the generation of key assignment data 2415 given a corresponding currently active set of feed receiver modules 2420 can distribute work loads across this set of active set of feed receiver modules 2420 evenly or substantially evenly. For example, each feed receiver module 2420 in this active set can be assigned as owner of a same or similar number of keys 2416. For example, this guarantee that feed receiver module 2420 in this active set can be assigned as owner of a same or similar number of keys 2416 can be achieved based on the key assignment data generation scheme utilized to generate each iteration of the key assignment data 2415 over time, such as a consistent hashing scheme that implements the key assignment data generation scheme. This guarantee can further improve the technology of data stream consumption by balancing processing required to emit messages across the set of feed receiver modules 2420 and/or by optimally utilizing system resources at any given time.

In some cases, each key 2416 can correspond to a same and/or similar proportion of keys in messages 2405 received over time. For example, this distribution can be automatically determined as the dataset is received over time in incoming message stream 2406, can correspond to an estimate for the distribution of keys 2416 in messages that are yet to be received, can be determined based on user configuration information, and/or can otherwise be determined. In such cases, different keys 2416 can include uneven proportions of keyspace 2417 that correspond to equal and/or similar proportions of the messages 2405 in incoming message stream 2406. For example, one key 2416 can correspond to only the value 0 based on 0 being a common value, while another key 2416 can correspond to the range of values 100-300 based on any given value in this range being less common, where the proportion of messages 2405 with a key value of 0 is historically and or expected to be the same as and/or similar to the proportion of messages 2405 with a key value falling within the range of values 100-300. This mechanism can further improve the technology of data stream consumption by balancing processing required to emit messages across the set of feed receiver modules 2420 and/or by optimally utilizing system resources at any given time.

In other cases where keys 2416 themselves not assigned according to their distributions in this fashion, the key assignment data 2415 can be generated such that the proportion of messages 2405 emitted and/or stored by any given feed receiver module 2420 is expected to be balanced and/or relatively equal. For example, some feed receiver modules 2420 are assigned as owner and/or follower of fewer keys 2416 based on having being keys that correspond to greater proportions of messages, while other feed receiver modules 2420 are assigned as owner and/or follower of more keys 2416 based on having assigned keys that correspond to smaller proportions of messages. This mechanism can further improve the technology of data stream consumption by balancing processing required to emit messages across the set of feed receiver modules 2420 and/or by optimally utilizing system resources at any given time.

FIG. 24B illustrates an embodiment of a feed receiver module 2420. The feed receiver module 2420 of FIG. 24B can be utilized to implement some or all of the feed receiver modules 2420 of FIG. 24A. Some or all features and/or functionality of the data stream processing system 2410 of FIG. 24B can be utilized to implement the data stream processing system 2410 of FIG. 24A and/or any other embodiment of the data stream processing system 2410 described herein.

As illustrated in FIG. 24B, a given feed receiver module 2420 can implement a controller module 2441, a data stream interface module 2442, a queue management module 2444, and/or a data stream emission module 2449. The controller module 2441, data stream interface module 2442, queue management module 2444, and/or data stream emission module 2449 can be implemented utilizing processing resources, memory resources, and/or communication interfaces of one or more corresponding computing devices 18 that implement the given feed receiver module 2420.

Each feed receiver modules 2420 can have their own controller module 2441, data stream interface module 2442, queue management module 2444, and/or data stream emission module 2449 that are implemented via resources that are distinct from other feed receiver modules 2420, such as resources of a corresponding one or more computing devices 18 that is distinct form the computing devices 18 utilized to implement other feed receiver modules. For example, as illustrated in FIG. 24B, feed receiver module 2420.1 of the feed receiver set 2425 of FIG. 24A implements a corresponding controller module 2441.1, a corresponding data stream interface module 2442.1, a corresponding queue management module 2444.1, and a corresponding data stream emission module 2449.1 that is separate from other feed receiver modules 2420.2-2420.Z.

The key assignment data 2415 of FIG. 24A can be collectively represented as a plurality of module key sets 2430.1-2430.Z, indicating assignments of keys for each feed receiver module 2420.1-2420.Z in the feed receiver set 2425. The module key set 2430 for a given feed receiver module 2420 can indicate an owned key set 2432 and a followed key set 2434 for the given feed receiver module 2420. The owned key set 2432 indicates all keys to which the given feed receiver module is assigned as an owner 2418 in the key assignment data 2415, and the followed key set 2434 indicates all keys to which the given feed receiver module is assigned as a follower 2419 in the key assignment data 2415.

The controller module 2441 can receive, generate, access, and/or otherwise determine a module key set 2430 of the corresponding feed receiver module 2420 indicated in key assignment data 2415. For example, a distributed configuration service that generated and/or accessed key assignment data 2415 can determine and/or send the module key set 2430.1 to feed receiver module 2420.1, can send the module key set 2430.2 to feed receiver module 2420.2, and so on. As another example, each feed receiver module 2420 generates or otherwise determines their own module key set 2430. In particular, each feed receiver module 2420 can generate their own module key set 243 based on feed receiver set state data indicating the set of currently active and/or participating feed receiver modules 2420.1-2420.Z. In such cases, the collective set of module key sets 2430.1-2430.Z generated by a set of feed receiver of a feed receiver set is consistent and renders key assignment data 2415 that meets some or all requirements discussed in conjunction with FIG. 24A. Such embodiments are discussed in further detail in conjunction with FIGS. 25D and 25E.

The controller module 2441 can send the identifiers of all keys 2416 of the determined module key set 2430 to a data stream interface module 2442. The data stream interface module 2442 of a given feed receiver module 2420 can subscribe to only ones of the messages in incoming message stream 2406 with keys included in the given feed receiver module's module key set 2430, rendering a message subset 2422 that includes a stream of only messages from the only incoming message stream 2406 with keys included in the given feed receiver module's module key set 2430.

For example, the data stream interface module 2442 filters the incoming message stream 2406 based on message subset 2422 to render the message subset 2422. The controller module 2441 can otherwise elect and/or determine that the corresponding feed receiver module 2420 receives and/or processes only ones of the only ones of the messages in incoming message stream 2406 with keys included in the given feed receiver module's module key set 2430.

The resulting message subset 2422 can be processed by a queue management module 2444, which can store a message queue 2445 that includes messages 2405 of message subset 2422. The queue management module 2444 can be implemented as a timed-ordered, in-memory message queue that is maintained by the feed receiver and/or that is buffered by time. As illustrated in FIG. 24B, the messages 2405 of incoming message stream 2406 can each include and/or otherwise indicate a key 2416, a timestamp 2413, and/or other data 2411 such as one or more values of one or more fields of a corresponding database row, record, and/or other data entry.

The controller module 2441 can send identifiers of keys 2416 included in the owned key set 2432 to the queue management module 2444. The queue management module 2444 utilizes the owned key set 2432 to send only owned messages 2448 for emission by the data stream emission module 2449. Only messages for keys to which the feed receiver module is an owner are produced as emitted messages 2424, for example, where these emitted messages 2424 are produced to a stream-processing software platform. Messages 2405 are optionally removed from the message queue 2445 once they are emitted by the data stream emission module 2449.

For example, the queue management module 2444 maintains a pointer in the message queue 2445, where the pointer indicates a next message to be emitted and progresses through the queue as messages are emitted in accordance with the time-based ordering of the queue. Messages with less recent timestamps are thus emitted before messages with more recent timestamps based on the time-ordering of the queue as the pointer progresses. Messages not owned by the feed receiver module 2420 in key assignment data 2415 are "skipped over" by the pointer, and are thus not emitted and continue to be maintained in message queue 2445. For example, after emitting a message owned by the feed receiver module 2420, the pointer progresses to a next message 2405 in the queue that is owned by the feed receiver module 2420, in accordance with the time-based ordering of the queue, where one or more messages between the most recently emitted message and the next message to be emitted in the time-based ordering of the queue are skipped based on followed by, but not owned by, the feed receiver module 2420. The pointer can strictly progress forward with time in accordance with the queue ordering, unless the key assignment data changes and requires newly owned messages prior to the pointer be retroactively emitted.

All other messages 2405 not owned by the feed receiver module 2420 continue to be maintained in the message queue until either: a time limit elapses, denoting these duplicates were emitted by their respective owners and thus weren't needed; or until the corresponding feed receiver becomes the new owner of the corresponding key, for example, due to a failure of the feed receiver assigned as owner of the key occurred. This time limit utilized to buffer the message queue 2445 can be dictated by a predetermined time window 2447, which can be the same for all feed receiver modules 2420. The time window 2447 can indicate a maximum amount of time that each message can be stored in message queue 2445. While the time window 2447 is illustrated as being sent to the queue management module 2444 by the controller module 2441, the time window 2447 can optionally be stored in memory accessible by the queue management module 2444 and/or can otherwise be determined directly by the queue management module 2444.

The time window 2447 can be received, accessed in memory, generated, and/or otherwise determined by the data stream processing system 2410. For example, the time window 2447 can be configured via user input. As another example, the time window 2447 can optionally be automatically selected based on: a streaming rate of incoming message stream 2406; a data size of messages 2405; a number of feed receiver modules 2420 in the feed receiver set 2425; the value of M; a proportion of keys assigned to be owned and followed by some or all feed receiver module 2420; a memory capacity of feed receiver modules 2420 to implement their message queue 2445; an average, worst case, and/or expected amount of time to detect a failed feed receiver module 2420; and/or an average, worst case, and/or expected amount of time for new key assignment data 2415 to be determined and adopted by feed receiver modules 2420 following a detected failure.

The queue management module 2444 can utilize timestamps 2413 of messages 2405, the time window 2447, and/or the current time to determine when messages have exceeded their allotted time in message queue 2445 as dictated by time window 2447, and/or when a message's timestamp 2413 otherwise compares unfavorably to time window 2447 and/or current time. Messages with timestamps 2413 that compare unfavorably to the time window 2447 and/or current time are removed from the message queue and/or are overwritten. Messages with timestamps 2413 indicating that they have not yet reached their allotted time in message queue 2445 as dictated by time window 2447 and/or that otherwise compare favorably to the time window 2447 and/or current time continue to be maintained by message queue. The timestamps 2413 of messages 2405 can be generated by stream source 2402 and/or can be extracted from messages 2405 received from the stream source 2402. Alternatively, the timestamps 2413 can be generated by feed receiver module 2420 based on when the corresponding messages 2405 are received and/or added to the message queue 2445.

Alternatively or in addition to time window 2447, a queue capacity limit can be utilized to maintain message queue 2445. For example, the message queue 2445 is maintained by queue management module 2444 in accordance with the queue capacity limit, and where messages that fall off the end of the queue as new messages are received are deleted, for example, based on being the oldest messages in the time-ordered queue.

If the feed receiver module becomes the owner of any new keys in updated key assignment data determined at a later point in time, corresponding messages still stored in message queue 2445 based on not yet comparing unfavorably to the time window 2447 can be emitted. The pointer maintained by queue management module 2444 can be repositioned to point to a prior message in the message queue 2445, where any newly owned messages in the queue are emitted if they are after the new position of the pointer in the time-ordering of the message queue 2445. In some embodiments, the pointer maintained by queue management module 2444 is repositioned to point to a start and/or least recent entry of the queue, where all messages with newly owned keys that are still stored in the queue are emitted.

In some embodiments, only a proper subset of newly owned messages that are stored in the queue are emitted. This proper subset can correspond to only newly owned messages that have a timestamp that are the same as or more recent than a determined timestamp for the new key assignment data. A feed receiver module 2420 that determines it is the new owner of a key 2416 in new key assignment data 2415 can utilize the determined, corresponding timestamp to identify any newly owned messages not guaranteed to have been already emitted by the prior owner. Messages in message queue 2445 with a newly owned key are only emitted if they have timestamps that are more recent than, and/or optionally the same as, the timestamp indicated by the updated key assignment data. Such messages are deemed to compare favorably with the timestamp indicated by the new key assignment data 2415. Messages that are less recent than the timestamp indicated by the new key assignment data 2415, deemed to compare unfavorably with the timestamp indicated by the key assignment data 2415, are not emitted, as they are presumed to have been emitted by the prior owner, as the prior owner is presumed to have been active prior to the timestamp. This can be ideal to minimize a number of duplicate messages in outgoing message stream 2408.

This can include feed receiver module 2420 scanning from the end of its time-ordered message queue 2445 to produce any messages with timestamps later than, and/or equal to, this determined timestamp. For example, the pointer maintained by queue management module 2444 is repositioned to point to another prior position in the queue that is after the start point, based on identifying a least recent message in the message queue 2445 with timestamp that is the same as and/or more recent than a determined timestamp dictating a particular backdated start time of the feed receiver module's new ownership of the key, such as a timestamp of a most recently emitted message by a prior owner of the key and/or a timestamp associated with failure of the prior owner.

FIG. 24C illustrates another embodiment of data stream processing system 2410. Some or all features and/or functionality of the data stream processing system 2410 of FIG. 24C can be utilized to implement the data stream processing system 2410 of FIG. 24A and/or any other embodiment of the data stream processing system 2410 described herein.

The data stream processing system 2410 can include and/or communicate with a central data streaming module 2450. For example, the central data streaming module 2450 is implemented by utilizing and/or communicating with a distributed streaming platform and/or event streaming platform. The central data streaming module 2450 is optionally implemented via any other one or more computing devices, and/or via any other processing and/or memory resources.

The central data streaming module 2450 can receive the emitted messages 2424 from feed receiver modules 2420 in feed receiver set 2425, and these messages can be consolidated to render outgoing message stream 2408. This can optionally include ordering messages 2405 emitted by different feed receiver modules 2420 by their respective timestamps 2413, where messages 2405 of outgoing message stream 2408 are ordered by timestamp 2413 regardless of whether they are received out of order by central data streaming module 2450.

FIG. 24D illustrates another embodiment of data stream processing system 2410. Some or all features and/or functionality of the data stream processing system 2410 of FIG. 24D can be utilized to implement the data stream processing system 2410 of FIG. 24A and/or any other embodiment of the data stream processing system 2410 described herein.

The data stream processing system 2410 can alternatively or additionally include and/or communicate with a feed receiver set management module 2412. For example, the feed receiver set management module 2412 is implemented by utilizing and/or communicating with a distributed configuration service. The feed receiver set management module 2412 is optionally implemented via any other one or more computing devices, and/or via any other processing and/or memory resources.

The feed receiver set management module 2412 can determine and/or maintain the current state of the feed receiver set 2425 as feed receiver module state data 2429. The feed receiver set management module 2412 can generate the feed receiver module state data 2429 at a given time based on feed receiver module status data 2421 received from feed receiver modules 2420, such as heartbeat data and/or health data generated by and/or received from feed receiver modules 2420. A state determination module 2427 can generate the key assignment data 2415 based on the feed receiver module status data 2421. For example, the feed receiver module state data 2429 can indicate a set of active feed receiver modules 2420, such as a subset feed receiver modules 2420 in the feed receiver set 2425 that are determined to not be undergoing an outage and/or with health data that compares favorably to a predefined health threshold, based on feed receiver module status data 2421.

Feed receiver module status data 2421 received or not received over time can indicate changes to the feed receiver module state data 2429, such as changes to which feed receiver modules 2420 are currently active and/or inactive. Updates to feed receiver module state data 2429 can be communicated to the feed receiver modules 2420 to enable the feed receivers to regenerate the key assignment data accordingly.

For example, the feed receiver set management module 2412 can detect when a new feed receiver modules 2420 is active based on receiving communication such as a heartbeat from the new feed receiver module 2420. The feed receiver set management module 2412 can detect when an active feed receiver module 2420 becomes inactive based on not receiving at least a predefined number of heartbeats, such as two heartbeats, from the active feed receiver module 2420. The time to discovery of a disconnected member can be a function of the heartbeat rate of an active connection. The heartbeat rate and/or the predefined number of heartbeats can be configured via user input and/or automatically selected based on a threshold outage discovery time. For example, if the predefined number of heartbeats is two heartbeats, for example, where the heartbeat rate is selected to be fast enough such that recovery within three heartbeats is acceptable. The time window 2447 can optionally be automatically selected as a function of and/or based on the time to discovery of a disconnected member, the heartbeat rate and/or the predefined number of heartbeats, for example, to ensure that messages will not be deleted prior to discovery of a failure and/or adoption of a corresponding update to key assignment data 2415. Alternatively or in addition, the heartbeat rate and/or the predefined number of heartbeats can optionally be automatically selected as a function of the predetermined time window 2447, for example, if the time window 2447 is fixed a function of the data rate of incoming message stream 2406, the number of feed receiver modules 2420 in the feed receiver set 2425, and/or the memory capacity of feed receiver modules 2420.

FIG. 24E illustrates another embodiment of feed receiver module 2420. Some or all features and/or functionality of the data stream processing system 2410 of FIG. 24E can be utilized to implement the data stream processing system 2410 of FIG. 24A and/or any other embodiment of the data stream processing system 2410 described herein.

Each feed receiver module 2420 can determine the most updated key assignment data 2415 over time based on the feed receiver module state data 2429, for example, received from the feed receiver set management module 2412 of FIG. 24D. In particular, each feed receiver module 2420 can implement a key set generator module 2423 to generate the key assignment data 2415, such as the full key assignment data 2415, or just its own module key set 2430. The current set of active and participating feed receiver modules 2420 indicated in the feed receiver module state data 2429 can dictate the corresponding key assignment data 2415. All feed receiver modules 2420 can utilize key set generator module 2423 to perform a same assignment function upon the same feed receiver module state data 2429, such as a same consistent hashing function, to ensure the resulting key assignment data 2415 is consistent across all feed receiver modules 2420. As new feed receiver module state data 2429 is received and/or determined over time by the feed receiver modules 2420, each feed receiver module 2420 can reperform this assignment function, such as the consistent hashing function, with the updated feed receiver module state data 2429 as input to generate updated key assignment data 2415 over time.

In some embodiments, each key assignment data 2415 can optionally have and/or indicate a corresponding timestamp denoting when this key assignment data 2415 should have effectively started and/or when ownership of one or more keys be backdated. In particular, reassignment after failure of a feed receiver module 2420 is not necessarily instantaneous, as feed receiver modules 2420 may have a lag in generating and/or determining updated key assignment data 2415 and/or data stream processing module 2410 may have a lag in identifying that a feed receiver module 2420 has failed. A timestamp indicating a start time for new ownership of a key in new key assignment data can therefore be utilized to determine which messages a newly assigned owner owns and should thus be emitted, for example, where only owned messages with timestamps that are the same as and/or more recent than the timestamp of the key assignment data 2415 are then recovered and produced from message queue 2445 by the respective owner.

This timestamp utilized to indicate the ownership starting time for one or more keys with new ownership can be determined by feed receiver module 2420 based on a time where the active set of feed receivers changed. For example, the timestamp is determined based on a time that the feed receiver module state data 2429 was updated, triggering the generation of new key assignment data 2415. As another example, the timestamp is determined based on a time that the feed receiver module status data 2421 indicated a failed and/or inactive feed receiver module 2420, and/or is determined based on a time that the feed receiver set management module 2412 detected the failed and/or inactive feed receiver module 2420.

As a particular example, this timestamp is determined based on most recent timestamp emitted by a feed receiver module 2420 detected to have failed. In such cases, feed receiver modules 2420 can produce a timestamp message as it emits its messages, indicating the timestamp of each emitted message. These timestamps, and/or a most recent emitted timestamp for each feed receiver module 2420, can be maintained by central data streaming module 2450 and/or in memory accessible by the data stream processing system 2410. When a new feed receiver assumes ownership of a key in new key assignment data 2415, it can determine the last produced timestamp by the prior owner based on determining the most recent one of their emitted timestamps, for example, based on accessing the timestamps maintained in this memory.

In such cases, rather than a same timestamp applying to activation of the new key assignment data 2415 as a whole, these timestamps only apply to one or more keys in the new key assignment data 2415 with new owners. If a failed feed receiver module 2420 owns multiple keys and/or if multiple feed receiver modules 2420 fail and dictate that multiple keys be assigned new owners, different keys can have different corresponding timestamps for the new key assignment data 2415, for example, based on the most recently emitted message of each different key having different respective timestamps. Thus, the recovery of messages with different keys can be backdated to these different timestamps by their respective new owners accordingly.

FIGS. 24F and 24G illustrate an example embodiment of how data stream processing system 2410 performs fault-tolerant data stream consumption. Some or all features and/or functionality of the data stream processing system 2410 can be utilized to implement the data stream processing system 2410 of FIG. 24A and/or any other embodiment of the data stream processing system 2410 described herein.

FIG. 24F illustrates the processing and emission of a set of messages 2405.1-2405.7 by data stream processing system 2410 based on being received in incoming message stream 2406. For example, these messages are sent by a stream source 2402 one at a time and/or are otherwise sent as part of a data stream.

In this example, the set of messages each include one of three keys A, B, or C that can implement keys 2416. In other embodiments, any number of possible keys of any data type can be included in messages 2405 as keys 2416. Note that in other embodiments, a much larger number of keys can be assigned as keys based on the keyspace having a large number of possible keys. While each given key 2416 is depicted as a singular, discrete value in the example of FIGS. 24F and 24G, each key 2416 in other embodiments can correspond to a subset of possible keys and/or a continuous range of values of possible keys as discussed previously.

The set of messages further include a timestamp that can implement timestamp 2413. Increasing values of these timestamps can indicate the corresponding message was transmitted at a later time by stream source 2402, and/or can otherwise indicate an ordering of messages that messages are sent by stream source 2402 and/or that messages are received by data stream processing system 2410 as incoming message stream 2406. While this example depicts timestamps of messages 2405 as Unix timestamps, any other type of timestamp can be employed. Some timestamps can optionally indicate identical times based on being transmitted by stream source 2402 at substantially the same time and/or at times that are within a timespan that is smaller than a granularity of the type of timestamp employed.

The key assignment data 2415.1 in the example of FIG. 24F indicates: feed receiver module 2420.1 (FR-1) is the owner of key C and a follower of key A and key B; feed receiver module 2420.2 (FR-2) is the owner of key A and a follower of key C; feed receiver module 2420.3 (FR-3) is a follower of key B; and feed receiver module 2420.4 (FR-4) is a the owner of key B and a follower of key A and key C. Note that every key has exactly one owner and exactly two followers, for example, based on M being fixed and/or determined to be two. While only four feed receiver modules FR-1-FR-4 are depicted in this example, any number of feed receiver modules 2420, such as far more feed receiver modules 2420, can be included in the feed receiver set 2425 processing incoming message stream 2406.

Based on determining this key assignment data 2415.1, the feed receiver modules FR-1-FR-4 maintain message queues 2445 accordingly, each storing only messages 2405 with keys that they either own or follow in their queues, ordered by timestamp. Note that while not illustrated, each feed receiver module FR-1-FR-4 can further maintain their corresponding message queue 2445 by removing messages from the message queue 2445 as they are emitted, and/or as they exceed the time limit indicated by time window 2447, as indicated by their timestamp and/or the current time.

Based on determining key assignment data 2415.1, the feed receiver modules FR-1-FR-4 also produce their own emitted messages 2424 by emitting only messages in their message queues 2445 with keys that are owned by the corresponding feed receiver modules. Note that FR-3 emits no messages in this example based on owning no keys.

This key assignment data 2415.1 can have been previously generated by applying a key assignment generation scheme, such as a consistent hashing scheme. For example, this key assignment data 2415.1 is generated based on an active set of feed receivers indicated in feed receiver module state data 2429, where assignment of FR-1-FR-4 to own and/or follow keys in key assignment data 2415.1 is based on FR-1-FR-4 being indicated as active and/or healthy feed receiver modules 2420 of feed receiver set 2425 in the feed receiver module state data 2429 utilized to generate key assignment data 2415.1.

FIG. 24G continues the example presented in FIG. 24F, illustrating data stream processing module 2410 at a later time than FIG. 24F. In particular, after FIG. 24F and prior to FIG. 24G, FR-4 is detected to fail and new key assignment data 2415.2 is generated as regenerated key assignment data based on the failure of FR-4. For example, this key assignment data 2415.2 is generated based on an active set of feed receivers indicated in more recent feed receiver module state data 2429 determined after FR-4 is detected to fail, where assignment of FR-1-FR-3 to own and/or follow keys in key assignment data 2415.2 is based on FR-1-FR-3 being indicated as active and/or healthy feed receiver modules 2420 of feed receiver set 2425 in the feed receiver module state data 2429 utilized to generate key assignment data 2415.2, and where FR-4 is not assigned to own and/or follow any keys in key assignment data 2415.2 is based on FR-2 being indicated as failed and/or inactive.

In particular, FR-4 is replaced as owner of key B by FR-3, for example, based on FR-3 already being a follower of key B and FR-4 not being included in the set of active feed receiver modules utilized to generate key assignment data 2415.2. For example, the key assignment data is generated by applying the same key assignment generation scheme utilized to the key assignment data 2415.1, such as a same consistent hashing scheme, where a different set of active feed receiver modules that no longer includes FR-4 is utilized as input. As a particular example, FR-3 is a most favorably ranked follower of key B in key assignment data 2415.1, and FR-3 is assigned as the owner of key B in key assignment data 2415.2 based on the owner FR-4 not being included in the set of active feed receiver modules for key assignment data 2415.2 and further based on FR-3 being the most favorably ranked follower of key B in the most recent key assignment data 2415.1.

Another feed receiver module 2420 in the feed receiver set, FR-5, is assigned as a follower of key B, for example, based on the fixed number of followers M being equal to 2 and based on FR-5 being indicated as active in the more recent feed receiver module state data 2429 utilized to generate key assignment data 2415.2. For example, FR-5 is assigned as the least favorably ranked follower of key B in key assignment data 2415.2 based on being newly assigned. Note that FR-5 may have been previously active and thus assigned to other keys in keyspace 2417 as an owner and/or follower in key assignment data 2415.1. Alternatively, FR-5 is a newly active feed receiver module that did not participate as an owner and/or follower in key assignment data 2415.1, for example, based on not having yet been active.

Similarly, as FR-4 can no longer follow key A, another feed receiver module 2420 in the feed receiver set, FR-7. is assigned as a follower of key A, for example, based on the fixed number of followers M being equal to 2 and based on FR-7 being indicated as active in the more recent feed receiver module state data 2429 utilized to generate key assignment data 2415.2. For example, FR-7 is assigned as the least favorably ranked follower of key A in key assignment data 2415.2 based on being newly assigned. Note that FR-7 may have been previously active and thus assigned to other keys in keyspace 2417 as an owner and/or follower in key assignment data 2415.1. Alternatively, FR-7 is a newly active feed receiver module that did not participate as an owner and/or follower in key assignment data 2415.1, for example, based on not having yet been active.

Furthermore, as FR-4 can no longer follow key C, FR-3 is assigned as a follower of key A, for example, based on the fixed number of followers M being equal to 2, and/or based on FR-3 still being indicated as active in the more recent feed receiver module state data 2429 utilized to generate key assignment data 2415.2. FR-3 can be assigned as the least favorably ranked follower of key A in key assignment data 2415.2 based on being newly assigned, where FR-2 becomes the most favorably ranked follower of key A in key assignment data 2415.2 based on based on shifting up in rank by one place due to FR-4 no longer being active and based on FR-4 having been a more favorably ranked follower than FR-2 in key assignment data 2415.1.

Based on these new assignments, FR-1-FR-4 adapt their storing and emitting of messages based on the most current assignment as owners and followers of keys indicated in key assignment data 2415.1. In particular, FR-3 begins following key C and therefore stores all newly received messages with key C in its message queue 2445.3 accordingly. Furthermore, FR-3 begins owning key B and therefore emits all newly received messages with key B in its message queue 2445.3 accordingly.

As the new owner of key B, FR-3 must therefore additionally identify that any messages in its message queue 2445 that were not guaranteed to be emitted by the previous owner, and emit these messages to ensure at-least-once processing. The timestamp for key B in key assignment data 2415.2, back to which prior messages must be emitted, can be determined by FR-3 based on determining a timestamp of a most recently transmitted message with key B by the prior owner FR-4. For example, FR-3 first determines it is the new owner of key B based on determining key assignment data 2415 by applying the key assignment data generation scheme to generate key assignment data 2415.2. In this example, the timestamp of message 2405.12, timestamp 1602890635, is determined as based on message 2405.12 being the most recently transmitted message by FR-4. For example, based on FR-3 determining it is the new owner for key B, FR-3 can then access and/or request the most recently emitted timestamp for key B. As a particular example, FR-3 requests and/or receives the timestamp of the most recently emitted message with key B from the central data streaming module 2450. Once this timestamp for key B is determined, FR-3 emits all previously stored messages with key B if they have timestamps that compare favorably with this timestamp for key B and/or for key assignment data 2415.2.

As a particular example, consider the case where FR-3 determines key assignment data 2415.2 at a point in time after having previously received messages 2405.9, 2405.10, 2405.12, and 2405.13. Messages 2405.9, 2405.10, 2405.12, and 2405.13 were previously stored by FR-3 based on having been a follower of key B in the key assignment data 2415.1 that it was utilizing to up to this point. Once key assignment data 2415.2 is determined, FR-3 recovers and emits messages 2405.12 from its message queue 2445 based on determining message 2405.12's timestamp matching the determined timestamp for key B in key assignment data 2415.2. FR-3 recovers and emits messages 2405.13 based on then emitting all other messages with key B after message 2405.12 in the time-ordered queue by timestamp, as these messages will also have timestamps and/or being after the timestamp of key assignment data 2415.2. FR-3 does not emit messages 2405.9 or 2405.10 from its message queue based on determining message 2405.9 and message 2405.10 have timestamps predating the determined timestamp for key B in key assignment data 2415.2, indicating these messages were previously emitted successfully and do not require replaying by FR-3.

In this example, the outgoing message stream 2408 will include a redundant copy of message 2405.12 because FR-4 had already successfully emitted message 2405.12 prior to failure. Because multiple messages can have identical timestamps, any of the new owner's queued messages for a newly owned key that have the same timestamp, in addition to those with more recent timestamps, must be emitted by the new owner to guarantee no messages with identical timestamps to the most recently emitted timestamp are missed. Thus, the timestamp for key B in key assignment data 2415.2 indicates emitted message 2405.12 be again emitted by FR-3 in its recovery of missed messages by FR-4. This example illustrates how the fault-tolerant mechanism of producing outgoing message stream 2408 can be an at-least-one processing scheme, where no messages will be missed if failures are within the fault-tolerance dictated by M, but some messages may be duplicated.

In other embodiments where timestamps cannot be identical, the new owner of a key can optionally only emit queued messages for the key with timestamps that are strictly more recent than the determined timestamp for the newly generated key assignment data. For example, in other embodiments, FR-3 emits message 2405.13 but not message 2405.12 based on only emitting messages with timestamps strictly after the determined timestamps for key B.

After determining the key assignment data 2415.2 and emitting the corresponding previously stored messages, FR-3 begins emitting all new messages that are received in incoming message stream 2406 with key B based on being assigned the owner of key B in key assignment data 2415.2. After determining the key assignment data 2415.2, FR-3 also stores messages with key C in its message queue based on being assigned a follower of key C in key assignment data 2415.2. Note that no timestamp need be determined for key C, as FR-3 cannot replay any missed messages with key C that may have been included in a non-redundant incoming message stream 2406 prior to determining to follow key C.

FIG. 24H illustrates an embodiment of a data stream processing system 2410 that communicates with a database storage system 2472. The data stream processing system 2410 can send its outgoing message stream 2408 to a database storage system 2472, for example, by utilizing system communication resources 14, wide area network(s) 22, external network(s) 17, and/or any other wired and/or wireless communication. The database storage system 2472 can be implemented utilizing database system 10 and/or another database system that stores records of a dataset and/or enables performance of queries upon its dataset. The database storage system 2472 can receive the key 2416, data 2411, and/or timestamp 2413 of each messages 2405 in outgoing message stream 2408 for storage. For example, each messages 2405 corresponds to one or more rows and/or records of one or more database tables, the database storage system 2472 receives these rows and/or records in outgoing message stream 2408, and the database storage system 2472 stores these rows and/or records as one or more database tables as they are received over time. One or more client devices 2474, such as end users of database system 10, can query the database storage system 2472 and/or can otherwise access historical data stored in the database storage system 2472. These or more client devices 2474 can receive raw data of stored messages 2405 and/or other query resultants in response, for example, for display by client device 2474 to an end user.

Alternatively or in addition, the data stream processing system 2410 can communicate directly with one or more client devices 2474. For example, the one or more client devices 2474 can correspond to end users that request and/or receive and/or process the key 2416 and/or data 2411 of each message 2405. The data stream processing system 2410 can send its outgoing message stream 2408 the one or more client devices 2474, for example, by utilizing system communication resources 14, wide area network(s) 22, external network(s) 17, and/or any other wired and/or wireless communication. Each client device 2474 can be implemented utilizing one or more computing devices 18. The client devices 2474 can receive the outgoing message stream 2408 for processing as a real-time stream of live data, where the outgoing message stream 2408 is directly streamed to client device 2474 and is considered sufficiently real-time and/or live despite communication lag. For example, the client devices 2474 can display via a display device, transform, retransmit, and/or otherwise process keys 2416, data 2411, and/or timestamps 2413 of outgoing message stream 2408 as a live stream. These client devices 2474 that receive the outgoing message stream 2408 from data stream processing system 2410 can be the same or different client devices 2474 that query or otherwise communicate with database storage system 2472.

FIG. 24I illustrates an embodiment of a data stream processing system 2410 that implements a value generator module 2460. In some cases, data 2411 included in each emitted message 2424 can be utilized as input to value generator 2460 to generate one or more computed values 2455 for each message via performance of one or more functions 2462. As illustrated in FIG. 24I, the central data streaming module 2450 can send data 2411 of outgoing message stream 2408 to value generator module 2460 for processing, can receive computed values 2455 from value generator module 2460, and can send computed values 2455, for example, as its own output data stream for storage, display, and/or other use by one or more end users. As a particular example, the stream of resulting computed values 2455 is to a database storage system 2472 for long term storage and/or to one or more client device 2474 as a stream of real-time data for display and/or further processing, for example, instead of or in addition to the original data 2411 of outgoing message stream 2408 as discussed in conjunction with Figure H. The same or different client device 2474 can optionally access and/or perform analytics upon computed values 2455 of historical computed values 2455 received and stored in database storage system 2472 over time.

Computed values 2455 can be generated as a function of only the key 2416, data 2411, and/or timestamp 2413 of a single corresponding message 2405. Alternatively or in addition, computed values 2455 can be generated as a function of keys 2416, data 2411, and/or timestamps 2413 of multiple messages 2405, such as a window of previously received messages 2405 of a given incoming message stream 2406. Alternatively or in addition, computed values 2455 can be generated as a function of keys 2416, data 2411, and/or timestamps 2413 of messages 2405 received in multiple different incoming message stream 2406, for example, corresponding to different types of data and/or corresponding to data received from different stream sources 2402.

As a particular example, a first non-redundant incoming message stream 2406 corresponding to constituent prices is received and processed via the feed receiver set 2425 to produce a first fault-tolerant outgoing stream 2408 corresponding to the constituent prices; a second non-redundant incoming message stream 2406 corresponding to exchange rates is simultaneously received and processed via the feed receiver set 2425 to produce a second fault-tolerant outgoing message stream 2408 corresponding to the exchange rates; and/or a third non-redundant incoming message stream 2406 corresponding to index calculation metadata is simultaneously received and processed via the feed receiver set 2425 to produce a third fault-tolerant outgoing message stream 2408 corresponding to the index calculation metadata. The value generator module 2460 receives these first, second, and third fault-tolerant outgoing data streams 2408 corresponding to the constituent prices, exchange rates, and index calculation metadata as input to function 2462 to generate computed values 2455, for example, corresponding to index value updates computed as a function of the constituent prices, exchange rates, and index calculation metadata. These computed values 2455 corresponding to index value updates are sent as a fourth data stream for storage in database storage system 2472 and/or for display and/or further processing as real-time data.

In various embodiments, a data stream processing system includes at least one processor and a memory that stores operational instruction. The operational instructions, when executed by the at least one processor, cause the data stream processing system to generate key assignment data. The key assignment data can indicate assignment of each of a plurality of subsets of a plurality of possible keys to a plurality of feed receiver modules, for example, via assignment of exactly one owner feed receiver module of the plurality of feed receiver modules to each key of a set of possible keys for a plurality of incoming messages, and/or via assignment of a set of follower feed receiver modules of the plurality of feed receiver modules to the each key of the set of possible keys. The operational instructions, when executed by the at least one processor, can further cause the data stream processing system to process the plurality of incoming messages via the plurality of feed receiver modules based on the key assignment data. Processing the plurality of incoming messages can include, for each feed receiver module in the plurality of feed receiver modules, receiving a proper subset of messages of the plurality of incoming messages with keys included in a corresponding subset of the plurality of subsets of the plurality of possible keys assigned to the each feed receiver module in the key assignment data. Processing the plurality of incoming messages can further include, for each feed receiver module in the plurality of feed receiver modules, maintaining a queue that includes messages of the proper subset of messages that compare favorably to a time window. Processing the plurality of incoming messages can further include, for each feed receiver module in the plurality of feed receiver modules, identifying owned ones of the proper subset of messages having keys included in an owned subset of keys in the corresponding subset, corresponding to keys in the corresponding subset to which the each feed receiver module is assigned as an owner in the key assignment data. Processing the plurality of incoming messages can further include, for each feed receiver module in the plurality of feed receiver modules, emitting only the owned ones of the proper subset of messages.

FIGS. 24J and 24K illustrate methods for execution by at least one processing module of a database system 10. Some or all of the method of FIG. 24J and/or FIG. 24K can be performed by the parallelized data input subsystem 11 of FIG. 4. Some or all of the method of FIG. 24J and/or FIG. 24K can be performed by the data stream processing system 2410 of FIGS. 24A-24I. Some or all of the method of FIG. 24J and/or FIG. 24K can be performed by one or more feed receiver modules 2420. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 24J and/or 24K. As a particular example, some or all of the method of FIG. 24K can be performed independently by multiple different nodes 37 and/or different computing devices 18 that implement different feed receiver modules 2420 of a plurality of feed receiver modules in a feed receiver set 2425. Some or all of the method of FIG. 24J and/or FIG. 24K can be performed based on communication with a central data streaming module 2450, a data processing module 2460, a database storage system 2472 and/or one or more client devices 2474. Some or all of the steps of FIG. 24J and/or FIG. 24K be performed to implement some or all of the functionality of the data ingress system 2410 as described in conjunction with FIGS. 24A-24I. Some or all of the steps of FIG. 24J and/or FIG. 24K be performed to implement some or all feed receiver modules 2420 of a feed receiver group 2425 as described in conjunction with FIGS. 24A-24I. Some or all steps of FIG. 24J and/or FIG. 24K can be performed via other processing resources and/or memory resources database system 10 in accordance with other embodiments of the database system 10 and/or nodes 37 discussed herein.

Step 2482 includes generating key assignment data indicating assignment of each of a plurality of subsets of a plurality of keys to a plurality of feed receiver modules. The set of possible keys can optionally correspond to a keyspace of a key column of a dataset, where the plurality of incoming messages includes records and/or rows of the dataset.

Generating the key assignment data can include assigning exactly one owner feed receiver module of the plurality of feed receiver modules to each key of a set of possible keys for a plurality of incoming messages. Generating the key assignment data can include assigning a set of follower feed receiver modules of the plurality of feed receiver modules to each key of the set of possible keys. For any given key in the set of possible keys, the exactly one owner feed receiver module assigned to the given key can be distinct from all feed receiver modules in the set of follower feed receiver modules assigned to the given key.

In some embodiments, step 2482 is performed by a single entity, such feed receiver set management module 2412. In other embodiments, step 2482 is collectively and/or independently performed by some or all of the plurality of feed receiver modules. For example, each feed receiver module generates some or all of the key assignment data, such as their own module key set 2430, based on feed receiver module state data 2429 received from feed receiver set management module 2412 and/or based on other determined state data indicating which of the plurality of feed receiver modules are active and/or which of the plurality of feed receiver modules are inactive.

In various embodiments, some or all of the key assignment data is generated separately and independently by each feed receiver module, for example, via their own key set generator module that performs a consistent hashing function utilizing feed receiver module state data as input. The received feed receiver module state data can be received by each feed receiver module from a same feed receiver set management module, and/or the same received feed receiver module state data can be determined and utilized by each feed receiver module. Alternatively, the key assignment data can optionally be generated via a consensus protocol mediated between the plurality of feed receiver modules 2420. Alternatively, the key assignment data is generated via a central processing entity of the data ingress system, such as the feed receiver set management module 2412.

Step 2484 includes processing the plurality of incoming messages via the plurality of feed receiver modules based on the key assignment data. For example, the data ingress system is implemented to process the plurality of incoming messages via the plurality of feed receiver modules based on the key assignment data based on the plurality of incoming messages being received in a non-redundant fashion. Processing the plurality of incoming messages via the plurality of feed receiver modules can include collectively emitting a plurality of messages, such as all of the incoming plurality of messages, in a redundant, fault-tolerant fashion.

Performing step 2484 of FIG. 24J can include performing, via each feed receiver module in the plurality of feed receiver modules, some or all steps of FIG. 24K. For example, individual feed receiver modules in the plurality of feed receiver modules each perform some or all steps of FIG. 24K, for example, independently and/or without coordination, to collectively perform step 2484 of FIG. 24J.

Step 2486 includes receiving, via each feed receiver module, a proper subset of messages of the plurality of incoming messages with keys included in a corresponding subset of the plurality of subsets of the plurality of keys assigned to the feed receiver module in the key assignment data. In various embodiments, each feed receiver module can subscribe to and/or select to receive ones of the plurality of incoming messages with keys included in its corresponding subset of the plurality of subsets based in indicating the keys included in its corresponding subset. In various embodiments, this can include each feed receiver module sending a request and/or sending subscription information indicating the keys in the corresponding subset of the plurality of possible keys to a stream source that emits the plurality of incoming messages, where the stream source sends proper subsets of messages of the plurality of incoming messages to each corresponding feed receiver module accordingly. In various embodiments, each feed receiver module ignoring all messages emitted by the stream source with keys that are not included in its corresponding subset of the plurality of possible keys. In various embodiments, the stream source can identify and send the appropriate proper subsets of messages of the plurality of incoming messages to each corresponding feed receiver module based on receiving, accessing, generating and/or otherwise utilizing the key assignment data.

Step 2488 includes maintaining, via each feed receiver module, a queue that includes messages of the proper subset of messages. This can include maintaining a queue that includes only messages that compare favorably to a time window. This can include each feed receiver module storing their received proper subset of messages in their own memory and/or utilizing memory resources accessible to the given feed receiver module. In various embodiments, the queue can be ordered by time and/or can be buffered by time. In various embodiments, each feed receiver module maintains the queue in accordance with a time-based ordering based on timestamps included in the proper subset of messages, where the queue is maintained by each feed receiver module to include only ones of the proper subset of messages with timestamps that compare favorably to the time window. For example, messages received within a fixed time frame from the current time and/or with timestamps indicating a time within the fixed time frame from the current time are maintained in the queue. As time passes, messages are removed from the queue once their time of receipt and/or timestamp no longer falls within this fixed time frame from the current time. In various embodiments, the time window is configured based on user input to an interactive interface displayed via a display device of a client device communicating with the data ingress system. In some embodiments, only ones of the proper subset of messages to which the corresponding feed receiver module is assigned as a follower are stored in the queue by the corresponding feed receiver module.

Step 2490 includes identifying, via each feed receiver module, owned ones of the proper subset of messages having keys included in an owned subset of keys in the corresponding subset. This owned subset of keys can correspond to keys in the corresponding subset to which each feed receiver module is assigned as an owner in the key assignment data.

Step 2492 includes emitting, via each feed receiver module, only the owned ones of the proper subset of messages. The owned ones of the proper subset of messages emitted collectively by all feed receiver modules can constitute an output stream of messages that is streamed in a redundant manner, due to the maintaining of messages in queues by the feed receiver modules and/or due to the assignment of feed receivers as owners and followers of various keys in the key assignment data. In some embodiments, messages that are emitted by a given feed receiver module are removed from and/or not stored in their respective queue due to having been emitted. In other embodiments, messages that are emitted by a given feed receiver module are maintained in their respective queue until the corresponding time window elapses for these messages.

In some embodiments, for some or all feed receiver modules, the owned subset of keys in their corresponding subset can be a proper subset of keys in the corresponding subset, where all other keys of the corresponding subset correspond to keys to which the given feed receiver module is assigned as a follower. In some embodiments, for some feed receiver modules, the owned subset of keys in their corresponding subset can be null subset, where all keys of the corresponding subset correspond to keys to which the given feed receiver module is assigned as a follower. In some embodiments, for some feed receiver modules, the owned subset of keys in their corresponding subset can constitute full corresponding subset, where the given feed receiver module is not assigned as a follower for any keys.

In various embodiments, the proper subset of messages of the plurality of incoming messages received by some or all given feed receiver modules includes followed ones of the proper subset of messages, based on having keys included in a followed subset of keys in the corresponding subset. This followed subset can corresponding to keys in the corresponding subset to which each given feed receiver module is assigned as a follower in the key assignment data.

In various embodiments, the followed ones of the proper subset of messages of a given feed receiver module are not emitted by the given feed receiver module. For example, the method can include foregoing transmission of followed ones of the proper subset of messages, where only owned ones of the proper subset of messages are transmitted. For example, the followed ones of the proper subset of messages are maintained in the queue until their respective time window, based on their own timestamps, elapses.

In various embodiments, one or more followed ones of the proper subset of messages are only transmitted by the corresponding feed receiver module only if the corresponding feed receiver module is reassigned as the owner of the respective keys of these one or more followed ones of the proper subset of messages, and if these one or more followed ones of the proper subset of messages are still stored in the queue maintained by the corresponding feed receiver module based on the time window for these one or more followed ones of the proper subset of messages not yet elapsing when this reassignment occurs.

In various embodiments, the method includes generating key reassignment data indicating assignment of a new plurality of subsets of the plurality of possible keys to a proper subset of the plurality of feed receiver modules. The method can further include processing the plurality of incoming messages via the plurality of feed receiver modules based on the key reassignment data. Processing the plurality of incoming messages via the plurality of feed receiver modules can include, for each feed receiver module in the plurality of feed receiver modules: receiving a second proper subset of messages of the plurality of incoming messages with keys included in a new subset of the new plurality of subsets of the plurality of possible keys assigned to the each feed receiver module in the key reassignment data; maintaining the queue to include all messages of the second proper subset of messages that compare favorably to the time window; and emitting only owned ones of the second proper subset of messages, based on having keys included in an owned subset of keys in the new subset, corresponding to ones of the new subset of the plurality of possible keys to which the each feed receiver module is assigned as an owner in the key reassignment data. In various embodiments, a set difference between the owned subset of keys in the new subset and the owned subset of keys in the corresponding subset is non-null for at least one of the plurality of feed receiver modules.

In various embodiments, the method can further include, for each of the plurality of feed receiver modules assigned as an owner to at least one new key in the key reassignment data: identifying newly owned messages as a subset of the proper subset of messages included in the queue, based on having keys included in a newly owned subset of keys to which the each feed receiver module is assigned as an owner in the key reassignment data; and emitting these newly owned messages. In various embodiments, each of the proper subset of messages in the queue maintained by the each feed receiver module includes a corresponding timestamp, and identifying the newly owned messages included in the queue includes identifying ones of the proper subset of messages in the queue having a key included in that newly owned subset of keys and further having timestamps that are more-recent than another timestamp associated with the key for the key reassignment data. In various embodiments, the other timestamp is generated based on a time that a failure condition was detected, a time that an offline condition was detected, and/or a time that the reassignment data was generated. In various embodiments, the other timestamp associated with the key for the key reassignment data is determined to be and/or is determined based on a most recently emitted message for the key, such as a most recently emitted message for the key by the prior owner for the key indicated in the key assignment data.

In various embodiments, the method includes determining to generate the key reassignment data based on detecting that one feed receiver in the plurality of feed receiver modules undergoes at a failure condition and/or or an offline condition. The proper subset of the plurality of feed receiver modules can be selected to not include the one feed receiver. Generating the key reassignment data can include assigning a new one of the plurality of feed receiver modules as the owner for each key in the owned subset of keys assigned to the one feed receiver in the key assignment data. Each new one of the plurality of feed receiver modules that is assigned as the owner for a corresponding key in the owned subset of keys assigned to this one failed and/or offline feed receiver in the key assignment data is selected based on being assigned as a follower of the corresponding key in the key assignment data.

In various embodiments, a number of feed receiver modules included in the set of follower feed receiver module for any given key can optionally be equal to a same, predetermined number of follower feed receiver modules. In various embodiments, the number of feed receiver modules can correspond to and/or dictate a fault-tolerance level of the data ingress system. In various embodiments, the number of feed receiver modules is determined based on user input to an interactive interface of a client device communicating with the data ingress system. In various embodiments, the number of feed receiver modules is determined based on a minimum fault-tolerance requirement that is received, automatically generated, configured via user input, and/or otherwise determined.

In various embodiments, assigning the set of follower feed receiver modules of the plurality of feed receiver modules to each key of the set of possible keys in generating the key assignment data includes assigning the same, predefined number of feed receiver modules of the plurality of feed receiver modules to the each key of the set of possible keys. In various embodiments, assigning the set of follower feed receiver modules of the plurality of feed receiver modules to each key of the set of possible keys in generating the key assignment data alternatively or additionally includes assigning a set of follower rankings to the set of follower feed receiver modules. In various embodiments, each new one of the plurality of feed receiver modules is further selected based on having a most favorably ranked one of the set of follower rankings of the set of follower feed receiver modules assigned to their corresponding key in the key assignment data.

In various embodiments, a remaining subset of the set of follower feed receiver modules assigned to each of these corresponding keys in the key assignment data can include all of the set of follower feed receiver modules for the given corresponding key in the key assignment data except for this new one of the plurality of feed receiver modules having the most favorably ranked one of the set of follower rankings. The method can include assigning a new follower ranking for each feed receiver modules in this remaining subset of the set of follower feed receiver modules assigned to each of these corresponding keys in the key assignment data in the key reassignment data. These assignments of these new follower rankings can be based on preserving an original ordering of the set of follower rankings, and/or can be based on incrementing each of the set of follower rankings to generate the new follower rankings.

For example, based on a current owner of a given key as denoted in the key assignment data going offline or failing, the most favorably ranked feed receiver module in a given set of follower feed receiver modules for the given key in the key assignment data becomes the owner of the given key in in the key reassignment data, and the second-most favorably ranked feed receiver module in a given set of follower feed receiver modules of the key assignment data becomes a most favorably ranked feed receiver module in the given set of follower feed receiver modules in the key reassignment data. If this new owner also goes offline or becomes unavailable, this most favorably ranked feed receiver module in the given set of follower feed receiver modules in the key reassignment data becomes the next owner of the given key, and so on.

In various embodiments, assigning the exactly one owner feed receiver module of the plurality of feed receiver modules to each key of a set of possible keys for a plurality of incoming messages includes applying a consistent hashing scheme. Assigning the new one of the plurality of feed receiver modules as the owner for each key in the owned subset of keys assigned to the one feed receiver in the key assignment data includes reapplying the consistent hashing scheme.

In various embodiments where generating the key reassignment data includes assigning the same, predefined number of feed receiver modules of the plurality of feed receiver modules to the each key of the set of possible keys, the method can further include assigning a new one of the plurality of feed receiver modules in each new set of follower feed receiver modules for the each corresponding key in the key reassignment data, based on the most favorably ranked one of the set of follower feed receiver modules assigned to the each corresponding key in the key assignment being assigned as the owner for the each corresponding key in the key reassignment data, and/or based on a requirement to preserve this same, predefined number of follower feed receiver modules. The new one of the plurality of feed receiver modules for the each corresponding key is assigned a least favorable one of the set of follower rankings in the key reassignment data based on incrementing the each of the set of follower rankings to generate the new follower rankings for the remaining subset of the set of follower feed receiver modules of the each corresponding key.

In various embodiments, the plurality of incoming messages is received from a streaming source that streams the plurality of incoming messages in accordance with a non-redundant scheme. A plurality of messages that includes only the owned ones of the proper subset of messages emitted via the each feed receiver module are collectively emitted by the plurality of feed receiver modules in accordance with a fault-tolerant scheme with a level of redundancy dictated by a number of feed receiver modules in the set of follower feed receiver modules assigned to the each key of the set of possible keys.

In various embodiments, the owned ones of the proper subset of messages are emitted to a central data streaming module of the data ingress system. The method can further include receiving, via the central data streaming module, a plurality of messages from the plurality of feed receiver modules that includes only the owned ones of the proper subset of messages emitted via each feed receiver module of the plurality of feed receiver modules. The method can further include emitting, via the central data streaming module, a single data stream that includes the plurality of messages received from the plurality of feed receiver modules.

In various embodiments, the method can further include receiving, via a data processing module of the data ingress system, the single data stream from the central data streaming module. The method can further include generating, via the data processing module, a plurality of computed values generated by performing at least one function upon values included in messages received in the single data stream. The method can further include emitting, via the data processing module, the plurality of computed values.

In various embodiments, the method can further include wherein the method further includes receiving, via the central data streaming module, the plurality of computed values from the data processing module. The method can further include emitting the plurality of computed values to at least one of: a database storage system for long-term storage, or a client device for display to an end user via a display device.

In various embodiments, a non-transitory computer readable storage medium includes at least one memory section that stores operational instructions. The operational instructions, when executed by a processing module that includes a processor and a memory, cause the processing module to: generate key assignment data indicating assignment of each of a plurality of subsets of a plurality of keys to a plurality of feed receiver modules, and/or processing the plurality of incoming messages via the plurality of feed receiver modules based on the key assignment data. Processing the plurality of incoming messages can include, for each feed receiver module in the plurality of feed receiver modules: receiving a proper subset of messages of the plurality of incoming messages with keys included in one subset of the plurality of subsets of the plurality of keys assigned to the each feed receiver module in the key assignment data; maintaining a queue that includes messages of the proper subset of messages that compare favorably to a time window; identifying owned ones of the proper subset of messages having keys included in an owned subset of keys in the one subset; and/or emitting only the owned ones of the proper subset of messages.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   generating key assignment data indicating assignment of each of a plurality of subsets of a plurality of possible keys to a plurality of feed receiver modules by assigning one owner feed receiver module of the plurality of feed receiver modules to each key of the plurality of possible keys for a plurality of incoming messages, and by further assigning a set of follower feed receiver modules of the plurality of feed receiver modules to the each key of the plurality of possible keys; and
   processing the plurality of incoming messages via the plurality of feed receiver modules based on the key assignment data.

2. A data stream processing system comprises:
   at least one processor; and
   at least one memory that stores operational instructions that, when executed by the at least one processor, cause the data stream processing system to:
   generate key assignment data indicating assignment of each of a plurality of subsets of a plurality of possible keys to a plurality of feed receiver modules by assigning one owner feed receiver module of the plurality of feed receiver modules to each key of the plurality of possible keys for a plurality of incoming messages, and by further assigning a set of follower feed receiver modules of the plurality of feed receiver modules to the each key of the plurality of possible keys; and
   process the plurality of incoming messages via the plurality of feed receiver modules based on the key assignment data.

3. The data stream processing system of claim 2, wherein at least one feed receiver module of the plurality of feed receiver modules maintains a queue in accordance with a time-based ordering based on timestamps of at least some of the plurality of incoming messages, and wherein the queue is maintained by the at least one feed receiver module to include only ones of the plurality of incoming messages of messages with timestamps that compare favorably to a time window.

4. The data stream processing system of claim 2, wherein a proper subset of messages of the plurality of incoming messages includes followed ones of the plurality of incoming messages, based on having keys included in a followed subset of keys in a corresponding subset the plurality of possible keys, corresponding to keys in the corresponding subset to which at least one feed receiver module of the plurality of feed receiver modules is assigned as a follower in the key assignment data, and wherein the followed ones of the plurality of incoming messages are not emitted by the at least one feed receiver module.

5. The data stream processing system of claim 2, wherein at least one feed receiver module in the plurality of feed receiver modules receives a proper subset of messages of the plurality of incoming messages, and wherein the operational instructions, when executed by the at least one processor, further cause the data stream processing system to:
   determine key reassignment data indicating assignment of a new plurality of subsets of the plurality of possible keys to a proper subset of the plurality of feed receiver modules;
   process the plurality of incoming messages via the plurality of feed receiver modules based on the key reassignment data by, via the at least one feed receiver module in the plurality of feed receiver modules:
      receiving a second proper subset of messages of the plurality of incoming messages with keys included in a new subset of the new plurality of subsets of the plurality of possible keys assigned to at least one feed receiver module in the key reassignment data;
      maintaining all messages of the second proper subset of messages that compare favorably to a time window; and
      emitting only owned ones of the second proper subset of messages, based on having keys included in an owned subset of keys in the new subset, corresponding to ones of the new subset of the plurality of possible keys to which the at least one feed receiver module is assigned as an owner in the key reassignment data.

6. The data stream processing system of claim 5, wherein a set difference between the owned subset of keys in the new subset and the owned subset of keys in a corresponding subset is non-null for at least one of the plurality of feed receiver modules.

7. The data stream processing system of claim 5, wherein the operational instructions, when executed by the at least one processor, further cause the data stream processing system to, via at least one of the plurality of feed receiver modules assigned as an owner to at least one new key in the key reassignment data:
   identify newly owned messages as a subset of the proper subset of messages, based on having keys included in a newly owned subset of keys to which the at least one feed receiver module is assigned as an owner in the key reassignment data; and
   emit the newly owned messages.

8. The data stream processing system of claim 7, wherein each of the proper subset of messages maintained by the at least one feed receiver module includes a corresponding timestamp, and wherein identifying the newly owned messages includes identifying ones of the proper subset of messages having a key included in the newly owned subset of keys and further having timestamps that are more-recent than another timestamp associated with the key for the key reassignment data.

9. The data stream processing system of claim 8, wherein the another timestamp is generated based on at least one of: a timestamp of a most recently emitted message for the key by a prior owner for the key indicated in the key assignment data.

10. The data stream processing system of claim 5, the operational instructions, when executed by the at least one processor, further cause the data stream processing system to:
   determine to generate the key reassignment data based on detecting that one feed receiver in the plurality of feed receiver modules undergoes at least one of: a failure condition, or an offline condition; and
   generate the key reassignment data based on assigning a new one of the plurality of feed receiver modules as the owner for each key in the owned subset of keys assigned to the one feed receiver in the key assignment data;
   wherein the proper subset of the plurality of feed receiver modules is selected to not include the one feed receiver; and
   wherein each new one of the plurality of feed receiver modules assigned as the owner for a corresponding key in the owned subset of keys assigned to the one feed receiver in the key assignment data is selected based on being assigned as a follower of the corresponding key in the key assignment data.

11. The data stream processing system of claim 10, wherein a set of follower feed receiver modules of the plurality of feed receiver modules are assigned to the each key of the plurality of possible keys in the key assignment data based on:
   assignment of a same, predefined number of feed receiver modules of the plurality of feed receiver modules to the each key of the plurality of possible keys; and
   assignment of a set of follower rankings to the set of follower feed receiver modules;
   wherein the each new one of the plurality of feed receiver modules is further selected based on having a most favorably ranked one of the set of follower rankings of the set of follower feed receiver modules assigned to the corresponding key in the key assignment data.

12. The data stream processing system of claim 11, wherein a remaining subset of the set of follower feed receiver modules assigned to the corresponding key in the key assignment data are assigned new follower rankings in the key reassignment data based on preserving an original ordering of the set of follower rankings, and based on incrementing each of the set of follower rankings to generate the new follower rankings.

13. The data stream processing system of claim 12,
   wherein the key reassignment data includes assignment of the same, predefined number of feed receiver modules of the plurality of feed receiver modules to the each key of the plurality of possible keys;
   wherein a new one of the plurality of feed receiver modules is assigned in each new set of follower feed receiver modules for the corresponding key in the key reassignment data based on the one of the set of follower feed receiver modules assigned to the corresponding key in the key assignment data, and having favorably ranked one of the set of follower rankings, being assigned as the owner for the corresponding key in the key reassignment data; and
   wherein the new one of the plurality of feed receiver modules for the corresponding key is assigned a least favorable one of the set of follower rankings in the key reassignment data based on incrementing the each of the set of follower rankings to generate the new follower rankings for the remaining subset of the set of follower feed receiver modules of the corresponding key.

14. The data stream processing system of claim 10,
   wherein the one owner feed receiver module of the plurality of feed receiver modules is assigned to each key of the plurality of possible keys for the plurality of incoming messages in the key assignment data based on application of a consistent hashing scheme, and wherein the new one of the plurality of feed receiver modules is assigned as the owner for each key in the owned subset of keys assigned to the one feed receiver in the key reassignment data based on reapplying of the consistent hashing scheme.

15. The data stream processing system of claim 2, wherein the plurality of incoming messages are received from a streaming source that streams the plurality of incoming messages in accordance with a non-redundant scheme, and wherein a plurality of messages that includes only owned ones of a proper subset of the plurality of incoming messages are collectively emitted by the plurality of feed receiver modules in accordance with a fault-tolerant scheme with a level of redundancy dictated by a number of feed receiver modules in a set of follower feed receiver modules assigned to each key of the plurality of possible keys in the key assignment data.

16. The data stream processing system of claim 2, wherein owned ones of a proper subset of messages of the plurality of incoming messages are emitted to a central data streaming module, and wherein the operational instructions, when executed by the at least one processor, further cause the data stream processing system to:
  receive, via the central data streaming module, a plurality of messages from the plurality of feed receiver modules that includes only the owned ones of the proper subset of messages emitted via at least one feed receiver module of the plurality of feed receiver modules; and
  emit, via the central data streaming module, a single data stream that includes the plurality of messages received from the plurality of feed receiver modules.

17. The data stream processing system of claim 16, wherein the operational instructions, when executed by the at least one processor, further cause the data stream processing system to:
  receive, via a data processing module of the data stream processing system, the single data stream from the central data streaming module;
  generate, via the data processing module, a plurality of computed values generated by performing at least one function upon values included in messages received in the single data stream; and
  emit, via the data processing module, the plurality of computed values.

18. The data stream processing system of claim 17, wherein the operational instructions, when executed by the at least one processor, further cause the data stream processing system to:
  receiving, via the central data streaming module, the plurality of computed values from the data processing module; and
  emitting the plurality of computed values to at least one of: a database storage system for long-term storage, or a client device for display to an end user via a display device.

19. The data stream processing system of claim 2, wherein a time window is configured based on user input to an interactive interface displayed via a display device of a client device, and wherein only messages of a proper subset of the plurality of incoming messages that compare favorably to the time window are maintained.

20. A non-transitory computer readable storage medium comprises:
  at least one memory section that stores operational instructions that, when executed by a processing module that includes a processor and a memory, causes the processing module to:
    generate key assignment data indicating assignment of each of a plurality of subsets of a plurality of possible keys to a plurality of feed receiver modules by assigning one owner feed receiver module of the plurality of feed receiver modules to each key of the plurality of possible keys for a plurality of incoming messages, and by further assigning a set of follower feed receiver modules of the plurality of feed receiver modules to the each key of the plurality of possible keys; and
    process the plurality of incoming messages via the plurality of feed receiver modules based on the key assignment data.

* * * * *